(12) United States Patent
Carroll et al.

(10) Patent No.: US 7,274,724 B2
(45) Date of Patent: Sep. 25, 2007

(54) METHOD, SYSTEM AND APPARATUS FOR AN ENHANCED ELECTRICALLY PUMPED OXYGEN IODINE LASER

(75) Inventors: David L Carroll, Urbana, IL (US); Joseph T Verdeyen, Savoy, IL (US); Wayne C Solomon, Champaign, IL (US); Darren M King, Champaign, IL (US)

(73) Assignees: CU Aerospace, LLC, Champaign, IL (US); University of Illinois at Urbana-Champaign, Urbana, IL (US)

( * ) Notice: Subject to any disclaimer, the term of this patent is extended or adjusted under 35 U.S.C. 154(b) by 325 days.

(21) Appl. No.: 11/079,751

(22) Filed: Mar. 14, 2005

(65) Prior Publication Data

US 2006/0078032 A1 Apr. 13, 2006

Related U.S. Application Data

(60) Provisional application No. 60/553,156, filed on Mar. 15, 2004.

(51) Int. Cl.
*H01S 3/095* (2006.01)
*H01S 3/09* (2006.01)

(52) U.S. Cl. .......................................... 372/89; 372/90
(58) Field of Classification Search ................. 372/89, 372/90
See application file for complete search history.

(56) References Cited

U.S. PATENT DOCUMENTS 6,826,222 B2 * 11/2004 Hill .............................. 372/89

* cited by examiner

*Primary Examiner*—Armando Rodriguez
(74) *Attorney, Agent, or Firm*—Adam K Sacharoff; Much Shelist

(57) ABSTRACT

In one embodiment of the present invention an oxygen iodine laser includes a gas mixing section. Ground state oxygen and a carrier gas are introduced into the first gas mixing section, sometimes separately. The laser includes a discharge region to generate at least said excited oxygen from the flow of the first gas mixing section. A sensitizer gas having a lower ionization threshold than ground state oxygen is also introduced into the first gas mixing section, such that electrons are more easily produced in the electrical generator. The laser system includes introducing a source of iodine into the excited singlet delta oxygen flow to generate a laser-active gas. In another embodiment a conditioner is placed into the gas mixing section to help mix the flow and/or introduce one or more of the aforementioned gases.

42 Claims, 33 Drawing Sheets

FIGURE 12
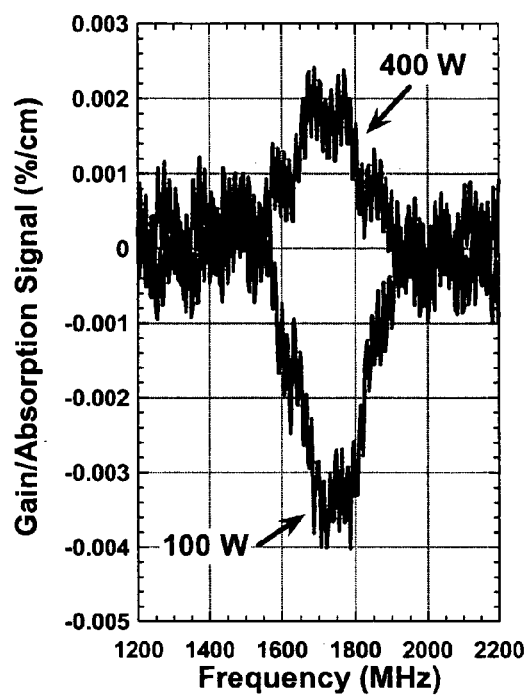
(a)
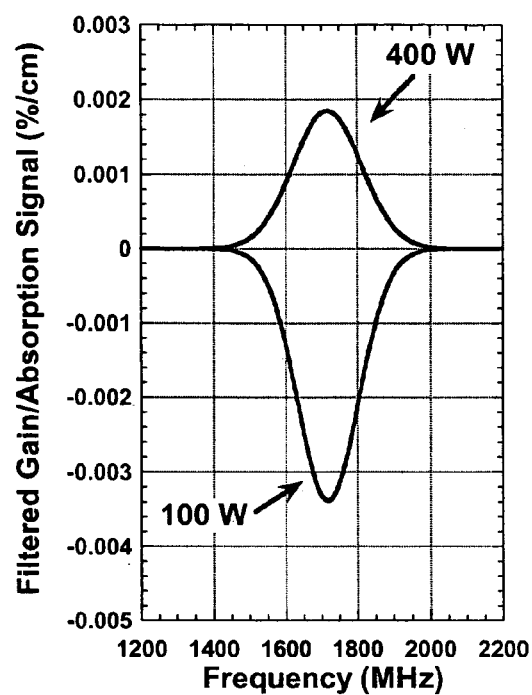
(b)

FIGURE 14
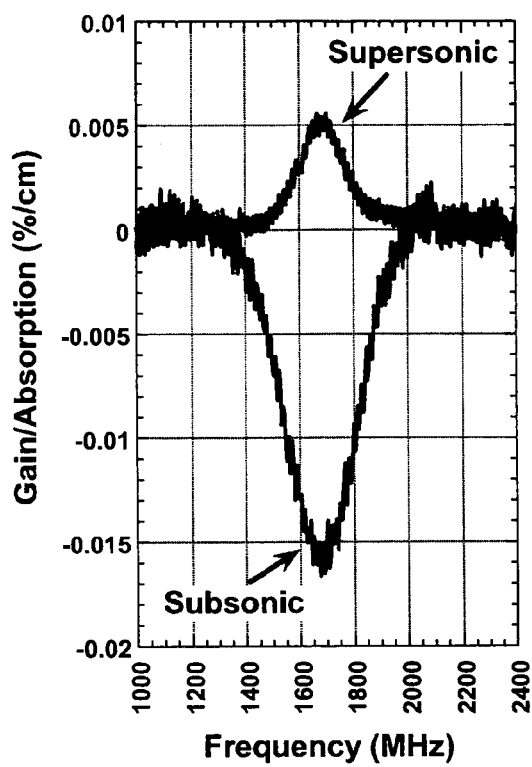
(a)
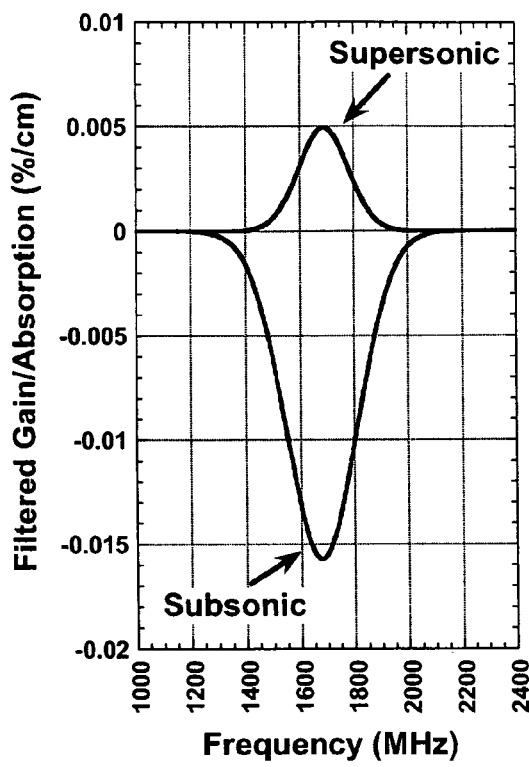
(b)

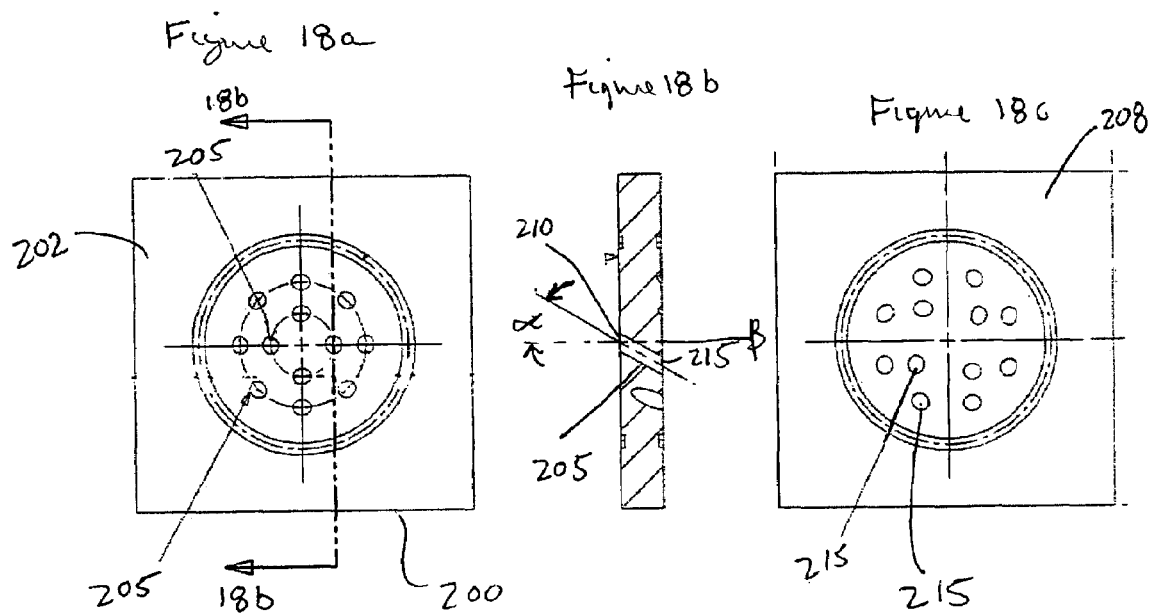

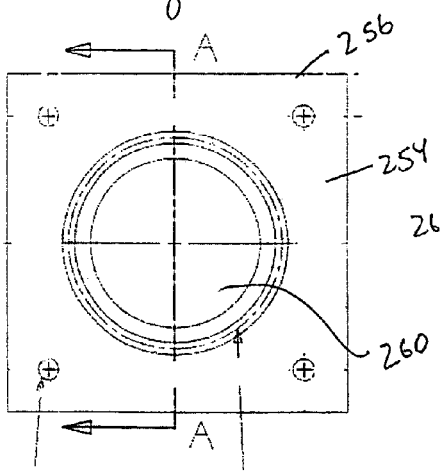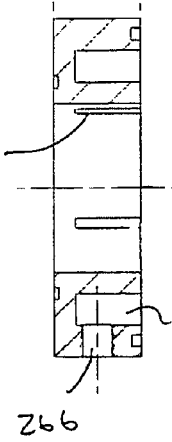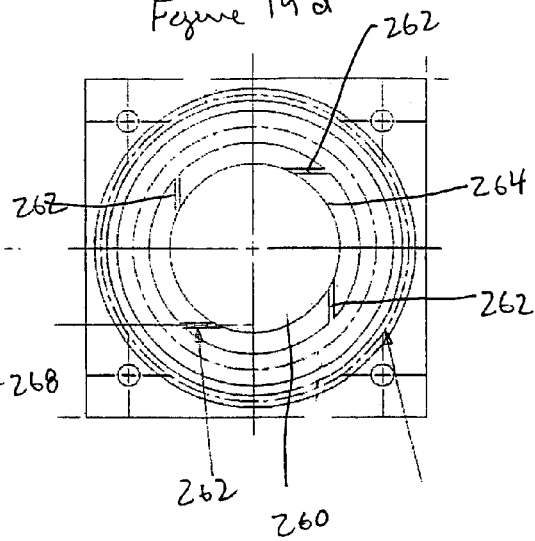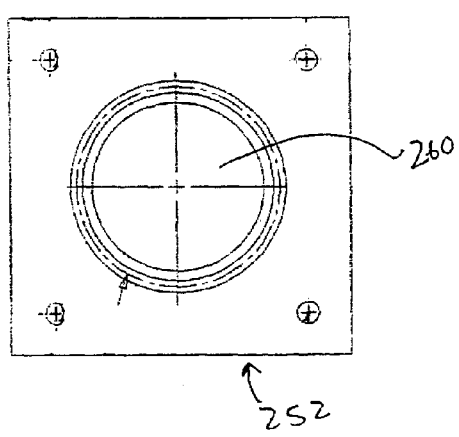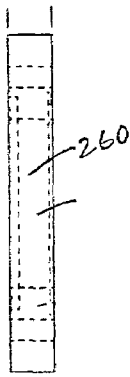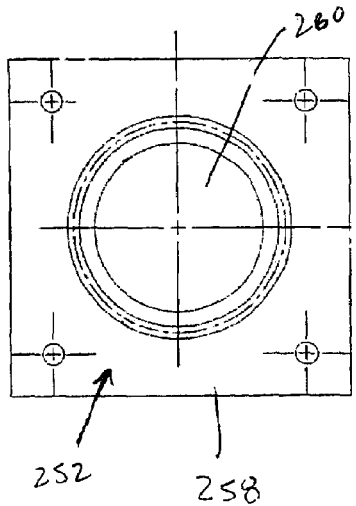

METHOD, SYSTEM AND APPARATUS FOR AN ENHANCED ELECTRICALLY PUMPED OXYGEN IODINE LASER

CROSS REFERENCE TO RELATED APPLICATIONS

This application claims benefit to U.S. Provisional Application 60/553,156 filed on Mar. 15, 2004.

GOVERNMENT LICENSE

The present invention was done under the following contracts with the Air Force Office of Scientific Research (AFOSR) under Contract #: F49620-02-1-0357 and the U.S. Army, Space and Missile Defense Command (USA/SMDC) under Contract #: DASG60-03-0098.

FIELD OF THE INVENTION

These technology enhancements significantly improve the discharge and post-discharge characteristics of an electrically pumped oxygen-iodine laser.

BACKGROUND OF THE INVENTION

The basic idea of using an electric discharge to create singlet-delta oxygen to drive an energy transfer iodine laser dates back to 1974, but all attempts to produce such a device have failed for a variety of reasons (many related to an incomplete understanding of the complexity of the system as a whole).

Oxygen-iodine laser (OIL) systems operate on the electronic transition of the iodine atom at 1315 μm between the levels of $I(^2P_{1/2}) \rightarrow I(^2P_{3/2})$ [hereafter denoted as I* (or excited iodine atoms) and I (or ground state iodine atoms), respectively]. The population inversion is produced by the near resonant energy transfer between the metastable excited singlet oxygen molecule, $O_2(a^1\Delta)$ [also denoted $O_2(a)$ hereafter], and the iodine atom ground state I. Conventionally, a two phase (gas-liquid) chemistry singlet oxygen generator (SOG) produces the $O_2(a)$ for a chemical oxygen-iodine laser (COIL). There are many system issues having to do with weight, safety and the ability to rapidly modulate the production of the $O_2(a)$ which have motivated investigations into methods to produce significant amounts of $O_2(a)$ using flowing electric discharges. Early attempts to implement electric discharges to generate $O_2(a)$ and transfer energy to iodine to make a laser failed to result in positive gain. Several investigations have also been conducted into the possibility of a continuous flow hybrid electrically powered oxygen-iodine laser with electric discharges to produce the $O_2(a)$. These studies have shown that flowing electric discharges through oxygen containing mixtures, typically diluted with a rare gas, can produce useful quantities of $O_2(a)$. Recent studies have demonstrated $O_2(a)$ yields greater than 15% using electric discharges and modeling results have indicated that such a system may produce a viable laser. More practical approaches were detailed in 2002 by Carroll et al in U.S. Pat. No. 6,501,780 the disclosure of which is incorporated herein by reference. Another possible approach is detailed in Hill's U.S. Pat. No. 6,826,222.

SUMMARY OF THE INVENTION

The innovative enhancements disclosed herein are major improvements to an existing method, system and apparatus for an electrically pumped oxygen iodine laser. In accordance with one embodiment of the present invention an oxygen-iodine laser system is provided which includes a laser resonator with a laser active gas mixture of at least excited oxygen and dissociated iodine. The laser system further includes a first gas mixing section, a first means to introduce ground state oxygen into the first gas mixing section to create an initial flow, and providing a carrier gas into the initial flow. The laser system also includes an electrical generator downstream of the first gas mixing section in which a primary flow comprising of at least said excited oxygen is electrically generated from the initial flow. A second means to introduce a sensitizer gas into the first gas mixing section, wherein the sensitizer gas has a lower ionization threshold than ground state oxygen such that electrons are more easily produced in the electrical generator. And the laser system includes a third means to introduce a source of iodine into the primary flow to generate a mixture of laser-active gas. The primary inventive concept of the first embodiment is the introduction of a sensitizer gas, which may be selected from, but not limited to, one of the following gases NO, $NO_2$, CO, $CO_2$, $N_2O$, $H_4N_2$, $N_2$, Hg, or $C_4H_4O$. The sensitizer gas typically consists of about 0.1 to 10% of the ground state oxygen flow rate.

The first embodiment may also include the novel approach introducing a heavier molecular weight diluent gas into the primary flow downstream of the electrical generator and upstream of a nozzle. The heavier molecular weight diluent gas may include but is not limited to one of the following Ar, or $N_2$. And the diluent gas may be cooled to help lower the total temperature and increase the density of the primary flow. Temperature ranges for the cooled diluent gas may be around 150 to 200K, however cooler temperature may be used. The introduction of the diluent gas may be positioned such that the diluent gas is introduced downstream of the source of iodine, however, it is within the scope to introduce the diluent gas upstream of the source of iodine.

The first embodiment may also include the introduction of $NO_2$ into the primary flow and such introduction may be made upstream or possible downstream of the point where atomic and/or diatomic iodine is introduced into the primary flow.

The present invention includes a second embodiment that is directed to an oxygen iodine laser having a gas mixing section for mixing a flow and further includes a conditioner for conditioning the flow. In a preferred system, the conditioner is placed in the first gas mixing section prior to the electrical discharge region. However, it is also contemplated to place the conditioner in the second gas mixing section after the electrical discharge region and within the primary flow.

The conditioner has a first side faced downstream of the gas mixing section and a second side faced upstream of the gas mixing section. The conditioner also includes an opened region to permit the flow from moving from a downstream position to an upstream position. The conditioner also includes the ability to mix the flow. Various aspects are considered and contemplated for mixing the flow. Two such novel concepts are presented in the present invention.

The first concept includes interspacing the opened region among a closed region and disposing the opened region at an angle offset from a longitudinal axis defined in the gas mixing section. It is further considered and illustrated herein to have a plurality of opened regions spaced about the closed region, and having each opened region disposed at a corresponding angle that is offset from the longitudinal axis defined in the gas mixing section. It is important to note that each corresponding angle does not have to be the same, this would provide the ability to enhance the mixing effect.

The second concept includes an outlet positioned along an interior sidewall defined by the opened region. The conditioner further includes an inlet defined through the conditioner and in communication with the outlet to introduce a gas into the gas mixing section. Further developments of the second conditioner include having an annular opened region with a plurality of outlets disposed to introduce the gas tangentially along the sidewalls.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 12 is a plot of gain in the supersonic cavity as a function of frequency—(a) raw signal, (b) digitally filtered signal. Positive gain was observed at 400 W rf discharge power and absorption was observed at 100 W;

FIG. 14 is a plot of Gain in the subsonic diagnostic section and the supersonic cavity as a function of frequency at 400 W rf discharge power with cooled $N_2$ injected upstream of the throat—(a) raw signal, (b) digitally filtered signal. Positive gain was observed in the supersonic section and absorption in the subsonic section.

FIGS. 18a-18c illustrate a first flow conditioning means;

FIGS. 19a-19g illustrate a second flow conditioning means;

DESCRIPTION OF THE EMBODIMENTS

Figure 1:
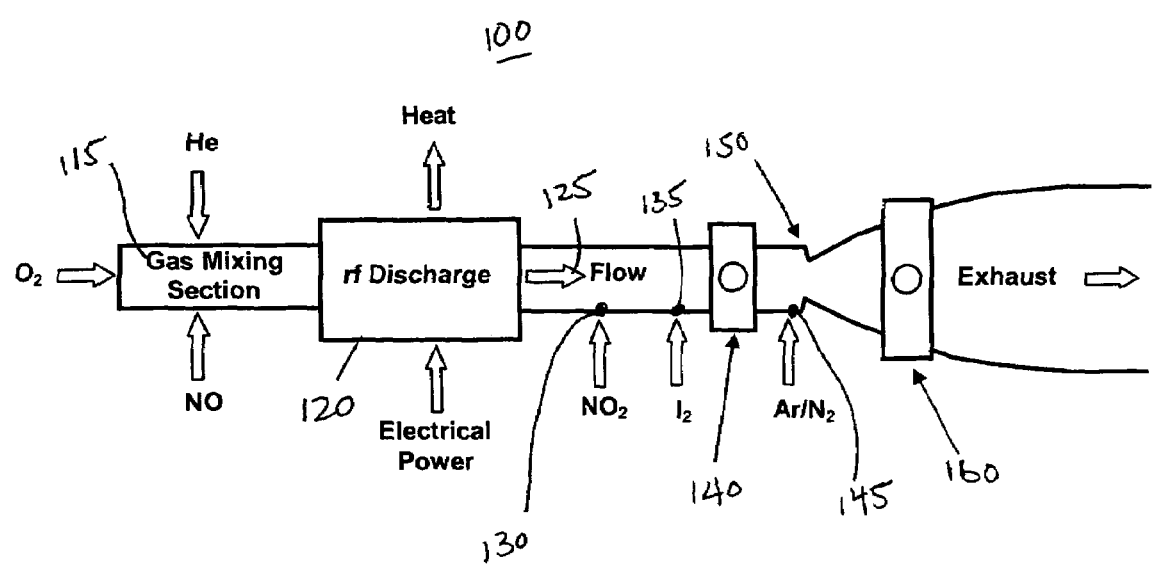
FIG. 1 is a schematic of the OIL laser system in accordance to a first embodiment.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring now to FIG. 1 in a first embodiment an electrically pumped oxygen iodine laser (OIL) system is illustrated and generally referenced to as 100. The OIL system includes a first electrical generator 120 to produce a primary flow 125 containing singlet-delta oxygen $O_2(a^1\Delta)$. The first electrical generator 120 is a radio frequency (hereinafter rf) discharge generator between two internal hollow cathode electrodes (approximately 13 cm long) operating at about 13.56 MHz. The plasma zone is approximately 4.9 cm in diameter and 25 cm long, similar discharge configurations were a part of U.S. Pat. No. 6,501,780.

Figure 11:
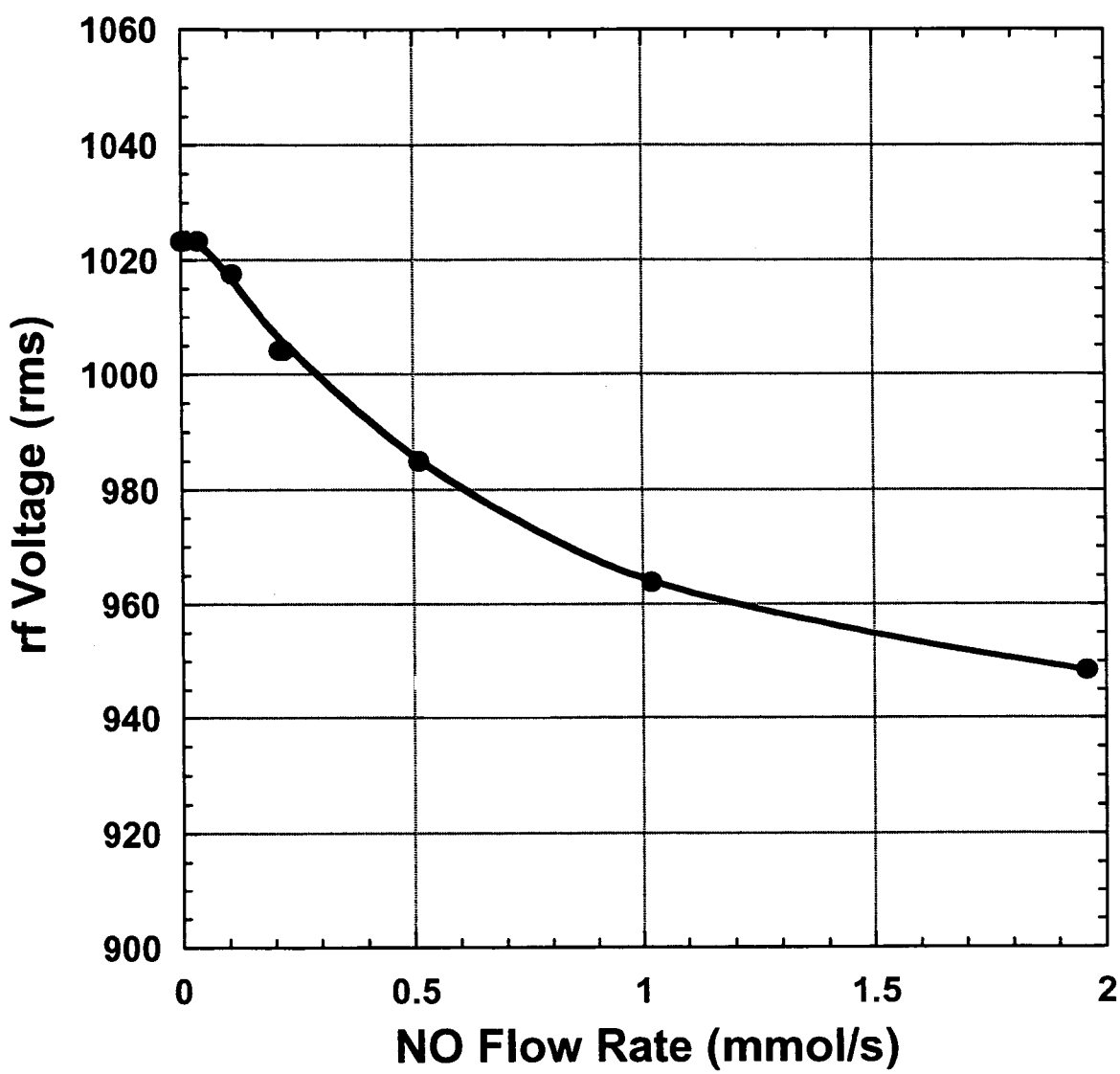
FIG. 11 is a plot of measured rf voltage as a function of the NO flow rate.

Two diagnostic ducts 140 and 160 were used for measurement purposes. The first diagnostic duct 140 was made in the subsonic region and has four windows through which simultaneous measurements are made of the optical emission from $O_2(a)$ at 1268 μm; $O_2(b^1\Sigma)$ [also denoted $O_2(b)$ hereafter] at 762 nm; I* at 1315 μm; and the gain/absorption proportional to $\{[I^*]-0.5\cdot[I]\}$. A Roper Scientific Optical Multi-channel Analyzer (OMA-V) with a 512-element InGaAs $LN_2$ cooled array, attached to an Acton Research SP-150 monochromator, was used for the spectral measurements at 1268 μm and 1315 μm. A Santa Barbara Instruments Group, Inc. ST-6 CCD camera coupled to a Jarrell Ash M10023100 monochromator was implemented to measure the emission of $O_2(b)$ at 762 μm. The second diagnostic duct 160 was made in the supersonic region in a supersonic nozzle 150 with view port windows. A preferred nozzle would be a Mach 2 supersonic nozzle A variety of Micro-Motion CMF and Omega FMA mass flow meters were used to measure the flow rates of the gases. A pair of Micro-Motion CMF-025's were used to measure the $O_2$ and Ar or $N_2$ flow rates, a Micro-Motion CMF-010 to measure the primary He flow rate, an Omega FMA3109 to measure the NO flow, an Omega FMA3108 to measure the secondary He flow that carries the $I_2$, and an Omega FMA3107 to measure the $NO_2$ flow. A diagnostic developed by Physical Sciences Inc. (PSI) was used that is based upon the continuum absorption of molecular iodine at 488 nm to measure the $I_2$ flow. Pressures in the subsonic and supersonic flow regions were measured by capacitance manometers from MKS (model 124AA-00100AB-S) and Leybold (model CM10). Incident and reflected powers from the rf matching network were measured by a Bird Thruline model 43 wattmeter (rf "System Power" is the difference of the incident and reflected powers). V-I characteristics for an estimation of E/N were taken with a Tektronix P6015 voltage probe and a Pearson Model 480 current monitor (note that V-I measurements are reported for only the cases reported in FIG. 11).

Measurements of gain (or absorption) were made with the Iodine-Scan diagnostic (ISD), developed by PSI. The ISD is a diode laser based monitor for the small signal gain in iodine lasers. The system uses a single mode, tunable diode laser that is capable of accessing all six hyperfine components of the atomic iodine transition. It was calibrated in frequency for automated operation for the hyperfine transition. A fiber optic cable was used to deliver the diode laser probe beam to the iodine diagnostic regions in both the subsonic portion of the flow tube and in the supersonic cavity. Since the ISD uses a narrow band diode laser, the measured lineshapes can also be used to determine the local temperature from the Voigt profile.

Wedged anti-reflection coated windows were used on the sides of both the subsonic diagnostic section and the supersonic cavity for the gain diagnostic to minimize etalon effects. A 2-pass configuration (10 cm path length) was used in the subsonic section and a 4-pass configuration (20 cm path length) in the supersonic section. Yield measurements of $O_2(a)$ were made from the gain diagnostic and relative I* to $O_2(a)$ spectral intensity measurements based upon known techniques.

During the course of the experiments with the first embodiment, it was determined that electric discharge stability and temperature control are important parameters to obtaining positive gain. Electric rf discharges sustained in moderate pressures (5 to about 15 torr) of oxygen are prone to instabilities such as arcing and constriction. The discharge production of O atoms, $O_3$ and other excited species adds higher levels of complexity to the downstream kinetics when the iodine donor species are added to the flow which are not encountered in a purely chemical generation system. The critical aspect of temperature control results from the equilibrium of the pumping reaction, $$O_2(a)+I \leftrightarrow O_2(X)+I^* \qquad (1.1)$$

where the forward rate is $7.8\times10^{-11}$ cm$^3$/molecule-s, and the backward rate is $1.04\times10^{-10}$ exp(−403/T) cm$^3$/molecule-s, with the equilibrium rate constant ratio of the forward to backward reactions being $K_{eq}$=0.75 exp(403/T)], where T is the gas temperature. The threshold yield of $O_2(^1\Delta)$ for positive I* to I inversion as a function of temperature can be written as $Y_{th}$=1/[1+1.5 exp(403/T)]. Note that the backward rate is slower, $K_{eq}$ larger, and $Y_{th}$ lower as T is decreased. It is further noted that $O_2(X)$ is used herein as an abbreviation for the $O_2(X^3\Sigma)$ ground state of oxygen.

Despite having achieved yields of $O_2(a)$ with an electric discharge that were, in principle, high enough to attain positive gain, it was still difficult to achieve positive gain. The experiments showed absorption in the supersonic region with temperatures of approximately 240 K, and yields that were approximately 15%, which should have been well over the required threshold yield, $Y_{th}$, of $O_2(a)$ required for positive gain. As such we began a rigorous investigation of the effects of iodine in the subsonic flow region without the added complication of the supersonic cavity. The iodine injection point 135 was placed upstream (approximately 20 cm) of a diagnostic section added into the subsonic flow tube, FIG. 1. Previously, the iodine was injected just upstream of the nozzle throat as in traditional COIL geometries. The present invention uses the term "iodine" injection or an injection/introdcuction of iodine to mean any source of iodine either an atomic or diatomic form and/or may come from an iodine carrying chemical composition.

Figure 2:
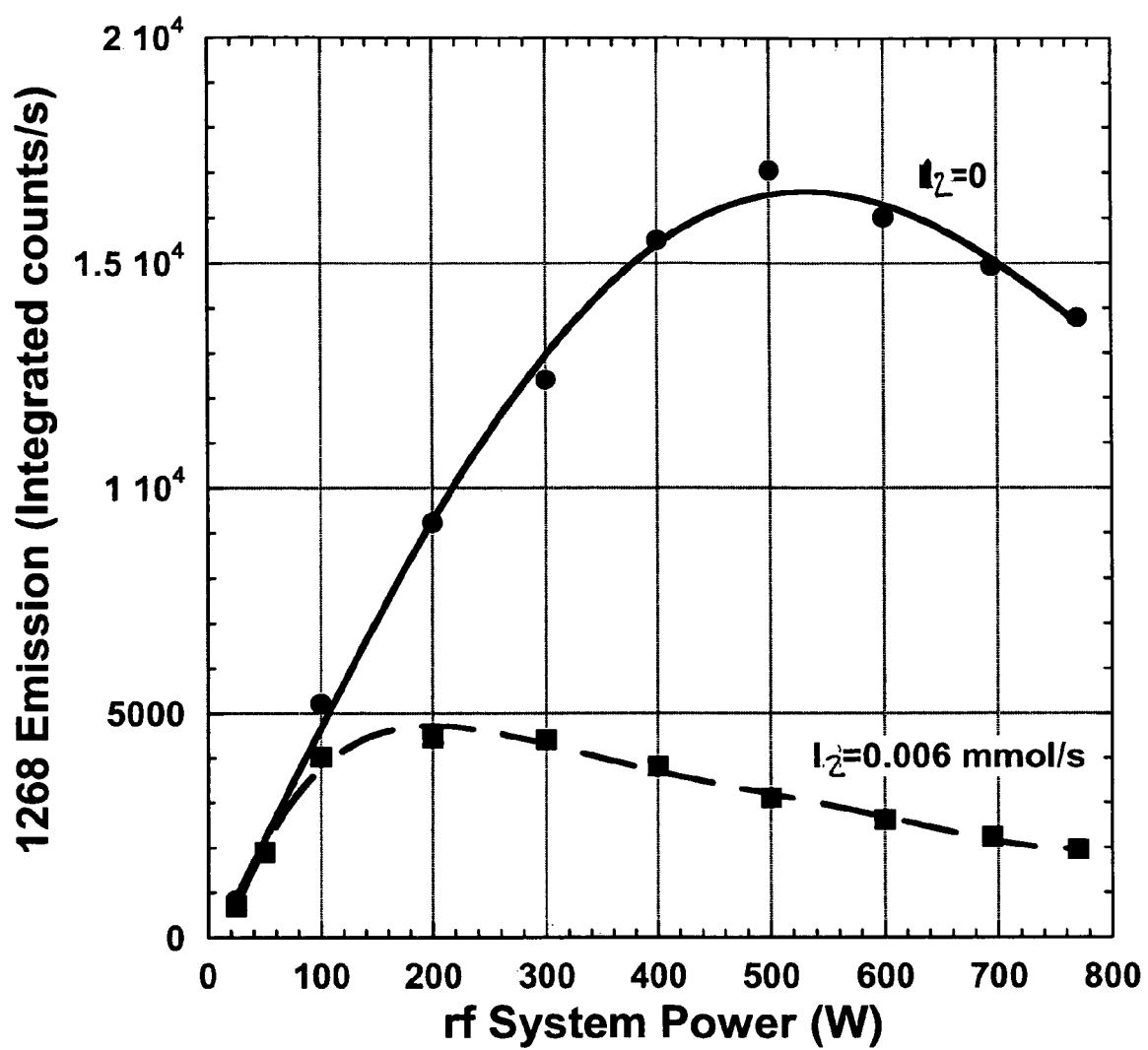
FIG. 2 is plot of $O_2(a)$ emission at 1268 μm with and without iodine at the subsonic diagnostic port as a function of system power, for a flow of 4 mmol/s of $O_2$ mixed with 16 mmol/s of He at a pressure of 10 torr.

Simultaneous measurements of the optical emission from $O_2(a)$ at 1268 μm, $O_2(b)$ at 762 μm, I* at 1315 μm, and the absorption through the optical windows in the subsonic diagnostic section. The initial 1268 µm emission measurements are illustrated in FIG. 2, the other results are shown later. Two important things are immediately apparent from these data. First, for the zero iodine case there is a drop in the 1268 signal that begins at around 500 W. (Note that rf system power is presented; electrical measurements indicate that approximately 80-90% of the system power is actually absorbed by the plasma for an $O_2$:He=1:4 mixture.) This drop in signal is believed to be a consequence of instabilities and thermal constriction that visibly develop in our existing discharge under these flow conditions. The second and more troubling observation from FIG. 2 is that when very small amounts of molecular iodine were added to the flow, the level of $O_2(a)$ emission at 1268 µm dropped dramatically. The flow rate of $O_2$ was 4 mmol/s with an estimated $O_2(a)$ yield of 15% at 500 W of rf power, therefore there should be approximately 0.6 mmol/s of $O_2(a)$. The iodine flow rate was approximately 0.006 mmol/s, i.e., only 1% of the $O_2(a)$ concentration. Given that the molecular iodine was only 1% of the $O_2(a)$ and that the O atoms should rapidly dissociate it, the dramatic drop in 1268 signal could not be explained by the classic COIL iodine dissociation process. Further, the concentration of atomic iodine, approximately 2% of the $O_2(a)$, was far too low to explain a significant drop in $O_2(a)$ from the pumping reaction. These facts lead us to the suggestion that whatever phenomenon is causing this dramatic drop in $O_2(a)$ may also be the primary reason for unsuccessfully attaining positive gain with electrically pumped systems. Further, it leads to the point that while measurements of high yields in pristine environments of a rare gas plus $O_2$ and the various other oxygen species from a discharge are encouraging, the issue of greater significance is the yield in the presence of iodine at high enough densities to be of interest.

Given the successful history of COIL, where the change in yield in the presence of iodine is negligibly small, the different character with this electrically pumped system is related to products of the discharge that are not present in classic COIL, i.e., products other than $O_2(a)$ and $O_2(b)$. Since the loss behavior occurs only with iodine present, it is believed that the loss must be through the I* channel, i.e., energy transfers through I* from $O_2(a)$ to some other species or into heating the gas. Various candidates are: O atoms, $O_3$, charged species, ultra-violet (UV) or vacuum ultra-violet (VUV) radiation. All could play a deleterious role and none appear in classic COIL. The most obvious candidate is atomic oxygen as it is present in number densities on the order of the $O_2(a)$. Modeling predicts that ozone is in quantities of two to three orders of magnitude lower than $O_2(a)$ and the charged species become negligible within a few cm downstream of the exit of the discharge, so these candidates seem less likely to be the major cause of the observed $O_2(a)$ loss. The fact that the present embodiment has discharge and flow tube sections that are co-linear allows radiation emitted in the discharge to be observed downstream, so it is conceivable that UV and VUV are playing some role, but the magnitude of this effect seems less likely to be a major contributor. As such, we focused in on oxygen atoms as being the major contributor to the deleterious loss of $O_2(a)$ when iodine was present.

Oxygen atoms play a positive role as well as a potential deleterious role in the kinetics downstream of the discharge region with iodine present. Their positive role is that they rapidly dissociate molecular iodine through processes (2) and (3):

$$I_2+O \rightarrow IO+I \qquad (1.2)$$

$$IO+O \rightarrow O_2+I. \qquad (1.3)$$

The rates for reactions (2) and (3) are $1.4 \times 10^{-10}$ cm$^3$/molecule-s,[18] and $1.5 \times 10^{-10}$ cm$^3$/molecule-s, respectively. The potential deleterious role of oxygen atoms was first postulated to be, $$I^*+O \rightarrow I+O. \qquad (1.4)$$

Recently it has been estimated this rate has an upper bound of $2 \times 10^{-12}$ cm$^3$/molecule-s; this is considerably smaller (an order of magnitude or more) than both the forward and backward rates of reaction (1) and hence this reaction was originally thought to be of limited importance in reasonably fast flowing systems such as our set up. There is presently no known temperature dependence for reaction (4). However, of the candidate processes listed for the dramatic loss of $O_2(a)$ in the presence of iodine, atomic oxygen seemed the most likely culprit and as such experiments were performed to test its effects.

Figure 3:
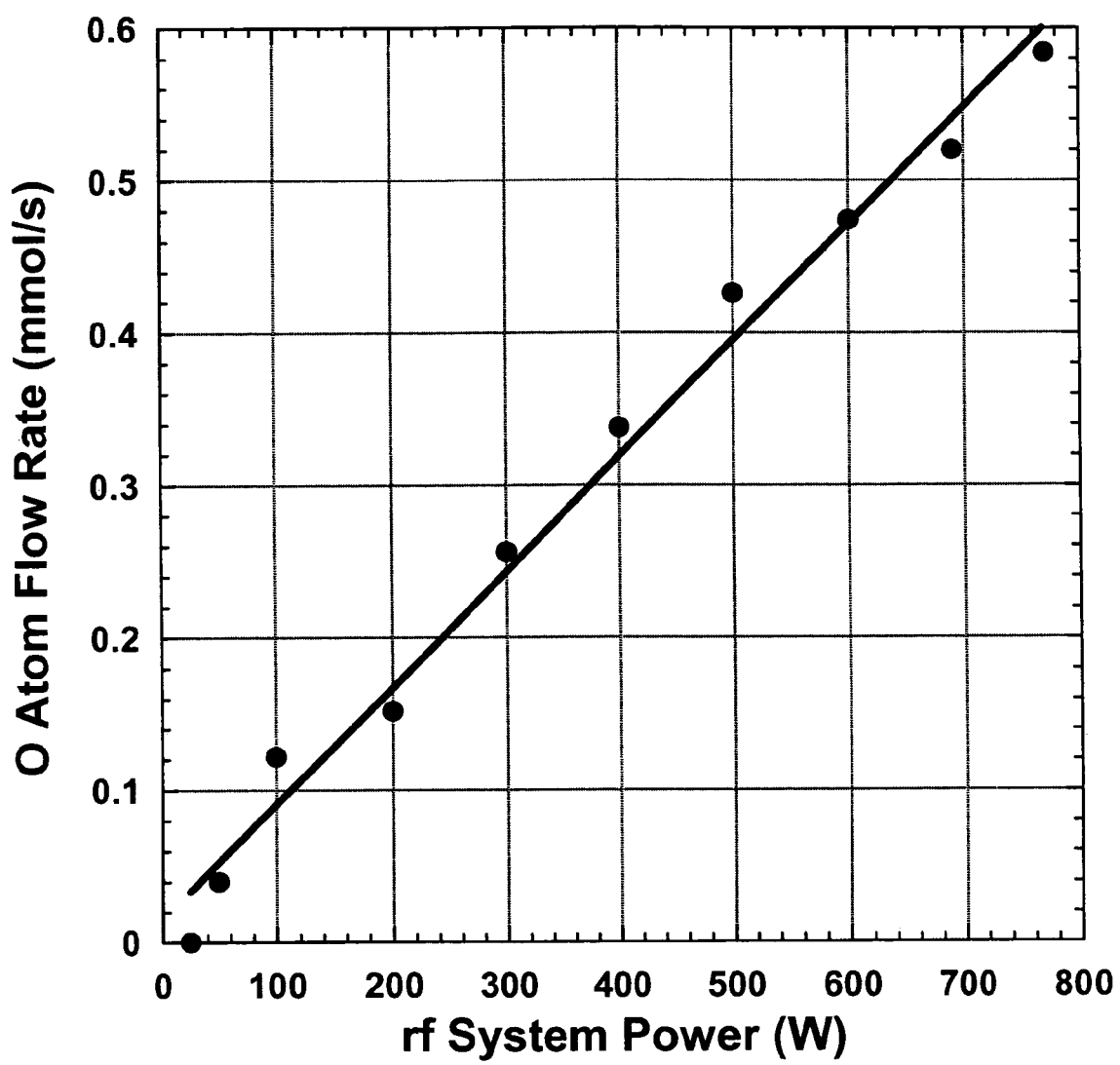
FIG. 3 is a plot of Oxygen atom titration measurements as a function of system power for a flow of 4 mmol/s of $O_2$ mixed with 16 mmol/s of He at a pressure of 10 torr.

In this embodiment the O atom production from the discharge was established as a function of power into the discharge by titrating with $NO_2$. For the first embodiment, the $NO_2$ injection point 130 was injected 50 cm downstream of the downstream electrode and into the flow 125. A mixture of 4 mmol/s of $O_2$ and 16 mmol/s of He was mixed in a gas mixing section 115 and the mixture was run through the rf discharge at a pressure of approximately 10 torr ($O_2$ partial pressure of 2 torr). FIG. 3 shows approximately a linear dependence of O atom production with discharge power; this linear behavior is consistent with previous modeling work in the range in which we are operating. At 300 W of system power, FIG. 3 shows an O atom flow rate of 0.25 mmol/s, or approximately an O atom yield of 6.3%.

From previous experiments made by the co-inventors, an O atom titration was run for a 5 mmol/s pure oxygen flow at 2.3 torr. This measurement gave an atomic oxygen yield of only 2.8% at an injection point 58.4 cm downstream of the exit of the discharge at a system power of 300 W (which corresponds to an absorbed power of approximately 265 W in the pure oxygen case). Interestingly, the 6.3% O atom yield for this helium diluted experiment is more than a factor of two higher than the pure oxygen case. It should be noted that measurements taken in previous experiment showed a factor of two higher $O_2(a)$ signals with the helium diluted case as compared to the pure oxygen case. Hence, this type of rf discharge, at these pressures and flow conditions, produces higher yields of both $O_2(a)$ and O when diluted by helium.

Figure 4:
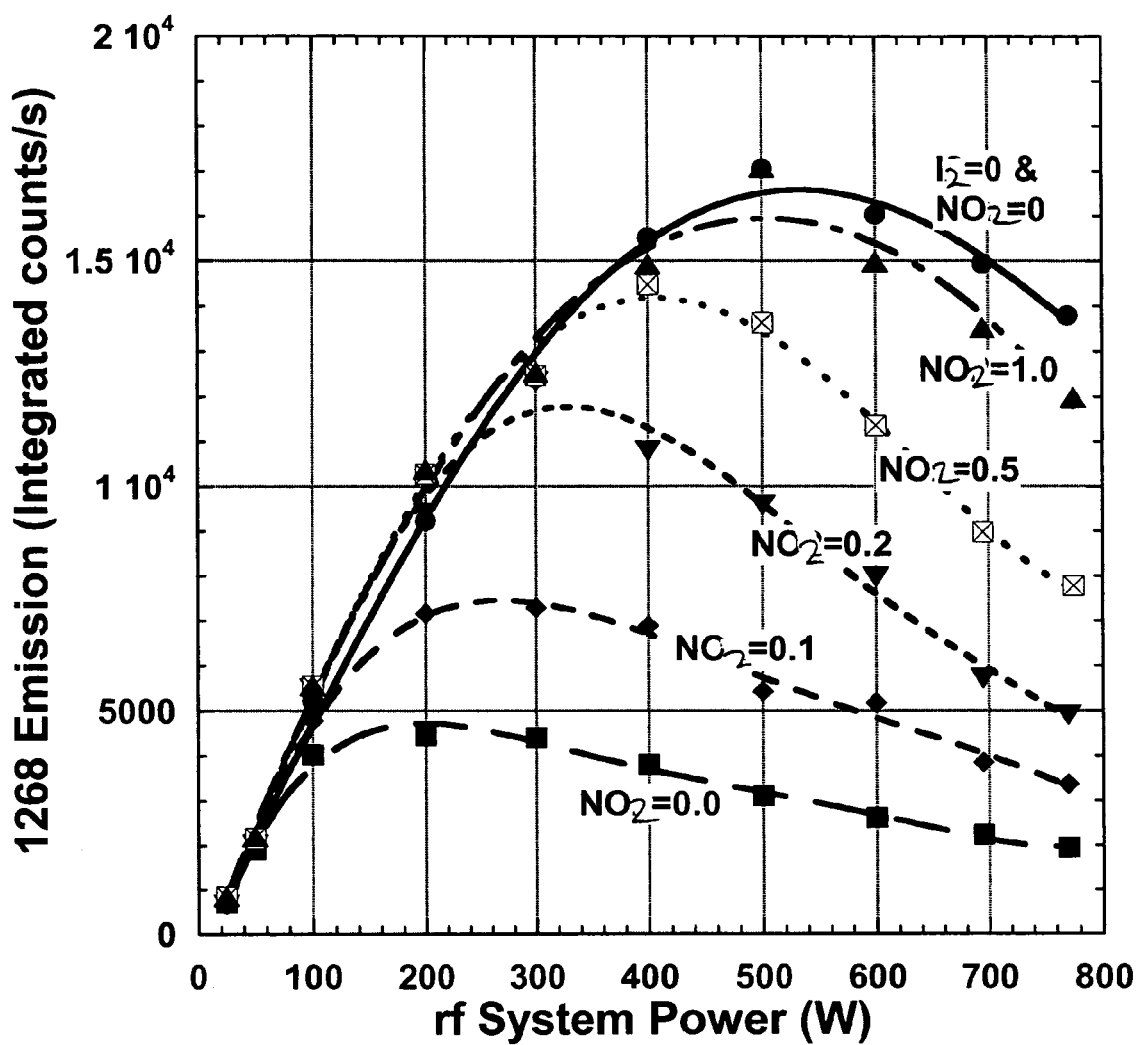
FIG. 4 is a plot of $O_2(a)$ emission at 1268 μm with and without iodine at the subsonic diagnostic port as a function of system power and the $NO_2$ flow rate, for a flow of 4 mmol/s of $O_2$ mixed with 16 mmol/s of He at a pressure of 10 torr. $NO_2$ flow rates are in mmol/s.

We then added $NO_2$ upstream of the iodine ring injector and monitored the emission at 1268, 1315 and 762 µm at the subsonic diagnostic section 140. FIGS. 4-7 show the dramatic changes that occur as the flow rate of $NO_2$ is increased. Note that as $NO_2$ was added the pressure in the discharge region was maintained at approximately 10 torr by adjusting a downstream flow rate of Ar, injected at point 145 and prior to the entrance of the nozzle 150 see FIG. 1. FIG. 4 clearly shows how increasing the $NO_2$ flow raises the 1268 signal in the presence of iodine progressively to approximate the signal with no iodine in the flow, i.e., by scavenging O atoms from the flow there is a progressively lesser effect from process (4). However, the situation is more complex than just that. Note that the point where we are almost back to the nominal 1268 signal occurs at an $NO_2$ flow rate of 1.0 mmol/s, yet the O atom flow at 770 W is only approximately 0.59 mmol/s, FIG. 3. This result was unexpected since the $NO_2$ flow rate is well beyond the full titration point, i.e. where $[NO_2]=[O]$ at the highest system power level. Since our mixing appears to be visibly complete within a few cm and the $O+NO_2$ reaction rate is fairly fast, approximately $1\times10^{-11}$ cm$^3$/molecule-s at room temperature, it is presently not understood why atomic oxygen must be significantly over-titrated to regain the majority of the $O_2(a)$ signal.

Figure 5:
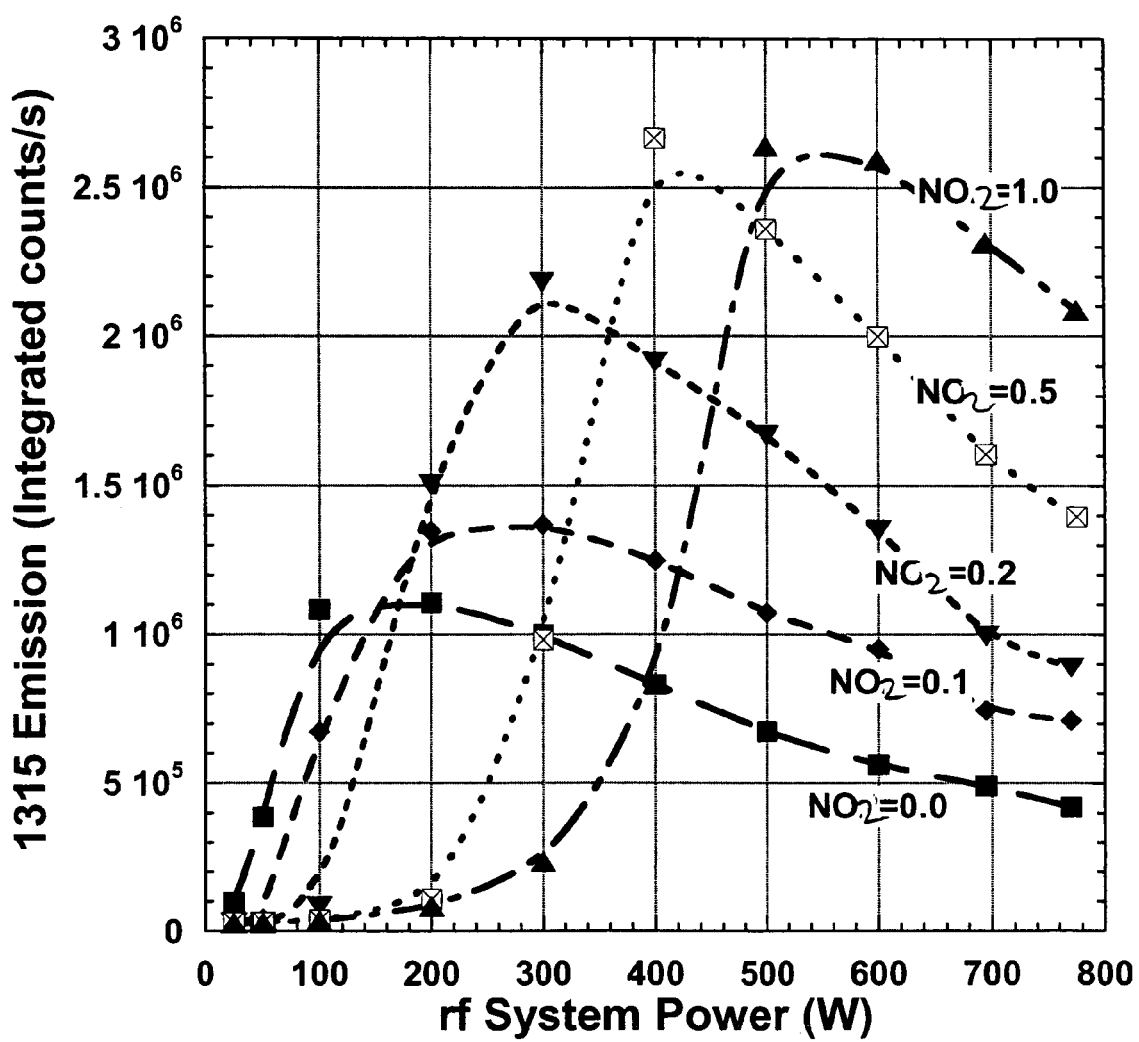
FIG. 5 is a plot of I* emission at 1315 μm at the subsonic diagnostic port as a function of system power and the $NO_2$ flow rate, for a flow of 4 mmol/s of $O_2$ mixed with 16 mmol/s of He at a pressure of 10 torr. $NO_2$ flow rates are in mmol/s.
Figure 6:
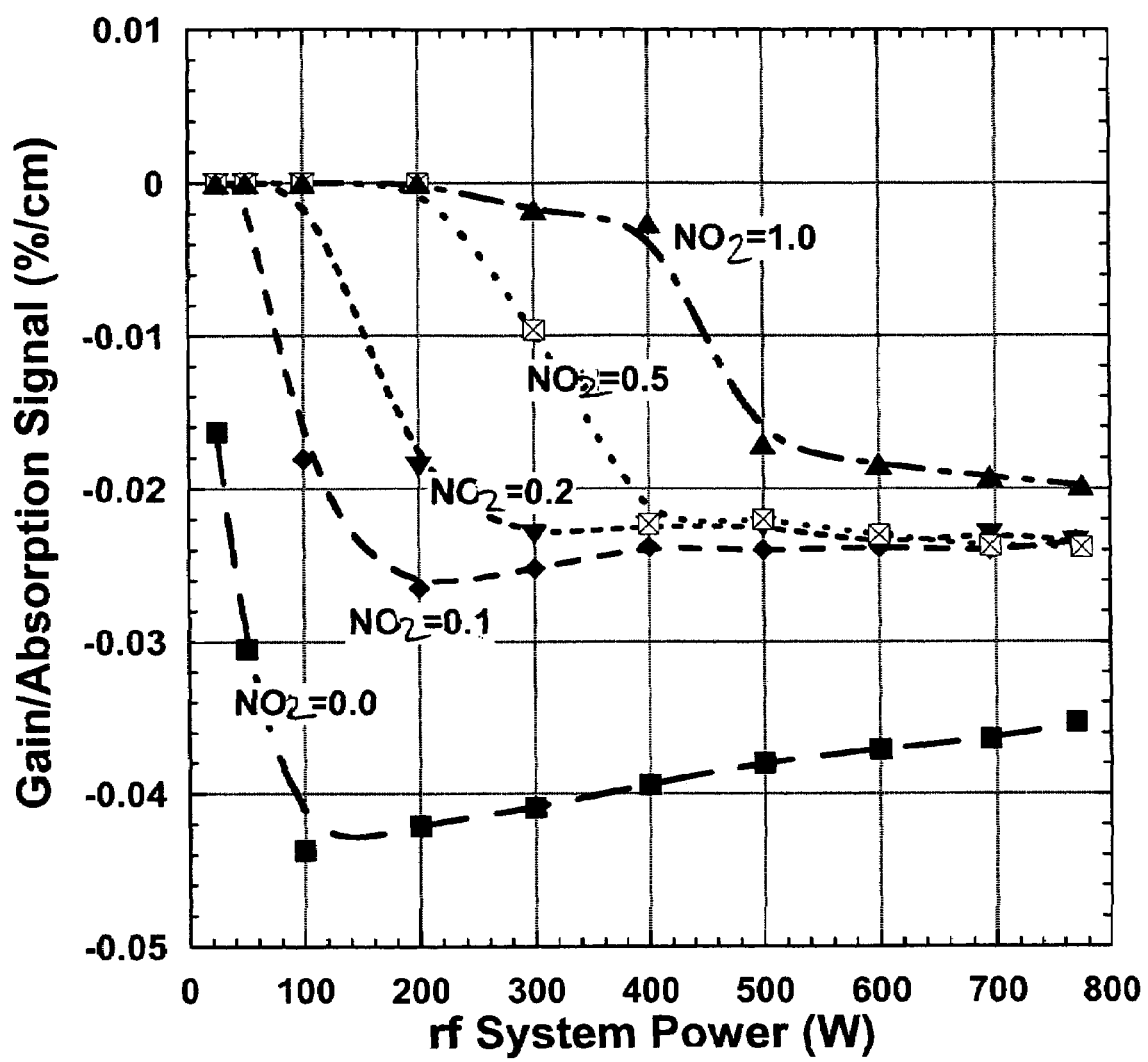
FIG. 6 is a plot of absorption at 1315 μm at the subsonic diagnostic port as a function of system power and the $NO_2$ flow rate, for a flow of 4 mmol/s of $O_2$ mixed with 16 mmol/s of He at a pressure of 10 torr. $NO_2$ flow rates are in mmol/s.

FIG. 5 illustrates the progressive rise in the I* emission with increasing $NO_2$ flow rate. This rise is consistent with the increasing $O_2(a)$ signal shown in FIG. 4. It is of considerable interest that the location of the peak signal shifts to higher powers with higher $NO_2$ flow rates. it is believed that simultaneously competing effects explain the majority of this phenomenon. First, as the $NO_2$ flow rate increases the $O_2(a)$ peak increases (and equivalently the yield) and shifts towards higher powers, FIG. 4; as the yield of $O_2(a)$ increases/decreases then so should the observed I* signal via the equilibrium of reaction (1). Note that the $O_2(a)$ signal peaks around 560 W where the discharge instabilities begin to occur; this helps to explain why the I* peak for the $NO_2=1.0$ mmol/s case is similar to the I* peak for the $NO_2=0.5$ mmol/s case, both of which occur in the region where the discharge instabilities first occur. Second, at higher $NO_2$ flow rates the atomic oxygen is severely over-titrated and thus the iodine dissociation fraction (and available atomic iodine) is reduced. FIG. 6 shows a decrease in absorption with increasing $NO_2$ flow rate. However, FIG. 6 also shows that there is no absorption observed at low power and high $NO_2$ flow; this is indicative of very little atomic iodine and hence a very small iodine dissociation fraction for these over-titrated cases.

Figure 7:
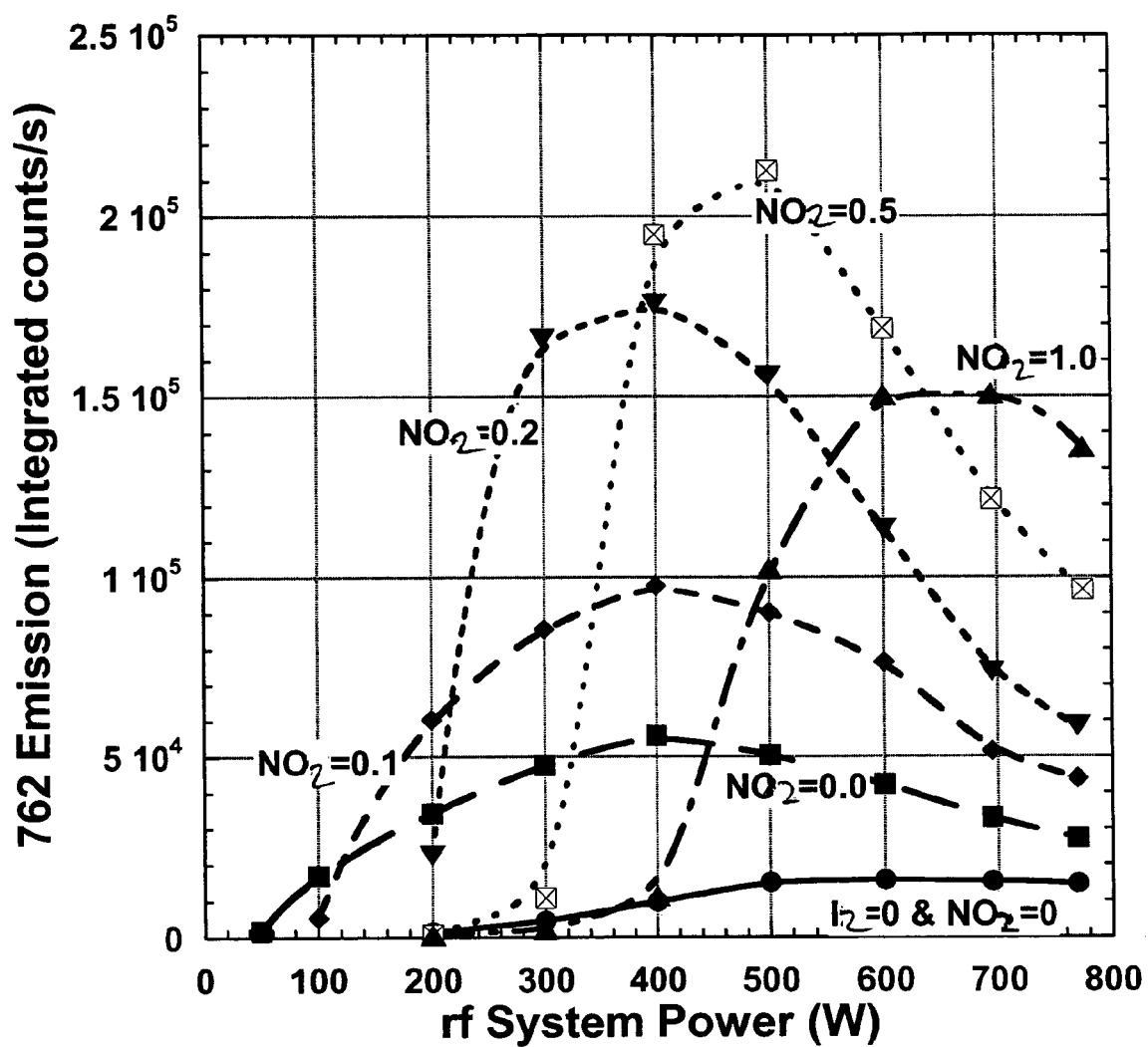
FIG. 7 is a plot of $O_2(b)$ emission at 762 μm with and without iodine at the subsonic diagnostic port as a function of system power and the $NO_2$ flow rate, for a flow of 4 mmol/s of $O_2$ mixed with 16 mmol/s of He at a pressure of 10 torr. $NO_2$ flow rates are in mmol/s.

FIG. 7 shows the dramatic increase of the $O_2(b)$ emission when $NO_2$ is added. First note that without $I_2$ and without $NO_2$, the $O_2(b)$ count rate is less than $2\times10^4$ but increases by at least a factor of 5 when 0.008 mmol/s of $I_2$ is added (at 400 W). It is believed that this is due to a combination of atomic iodine formed by reactions (2) and (3) along with reaction (1) to produce I* followed by $$I^* + O_2(a) \rightarrow I + O_2(b), \tag{1.5}$$

which has a reaction rate of $1.0\times10^{-13}$ cm$^3$/molecule-s. While this is a negligible loss to $O_2(a)$ it is a significant production rate of $O_2(b)$. When $NO_2$ is added, the quenching of $O_2(b)$ by the O atoms is reduced in proportion to the reduction of O atoms.

$$O+O_2(b)\rightarrow O+O_2(a), \; [k_{6a}=7.2\times10^{-14} \text{ cm}^3/\text{molecule-s}^{22}] \tag{1.6a}$$

$$O+O_2(b)\rightarrow O+O_2, \; [k_{6b}=0.8\times10^{-14} \text{ cm}^3/\text{molecule-s}^{22}] \tag{1.6b}$$

And the production of $O_2(b)$ by reaction (1.5) is enhanced. The combination leads to a quadratic if not exponential growth in $O_2(b)$ with increased power.

Figure 8:
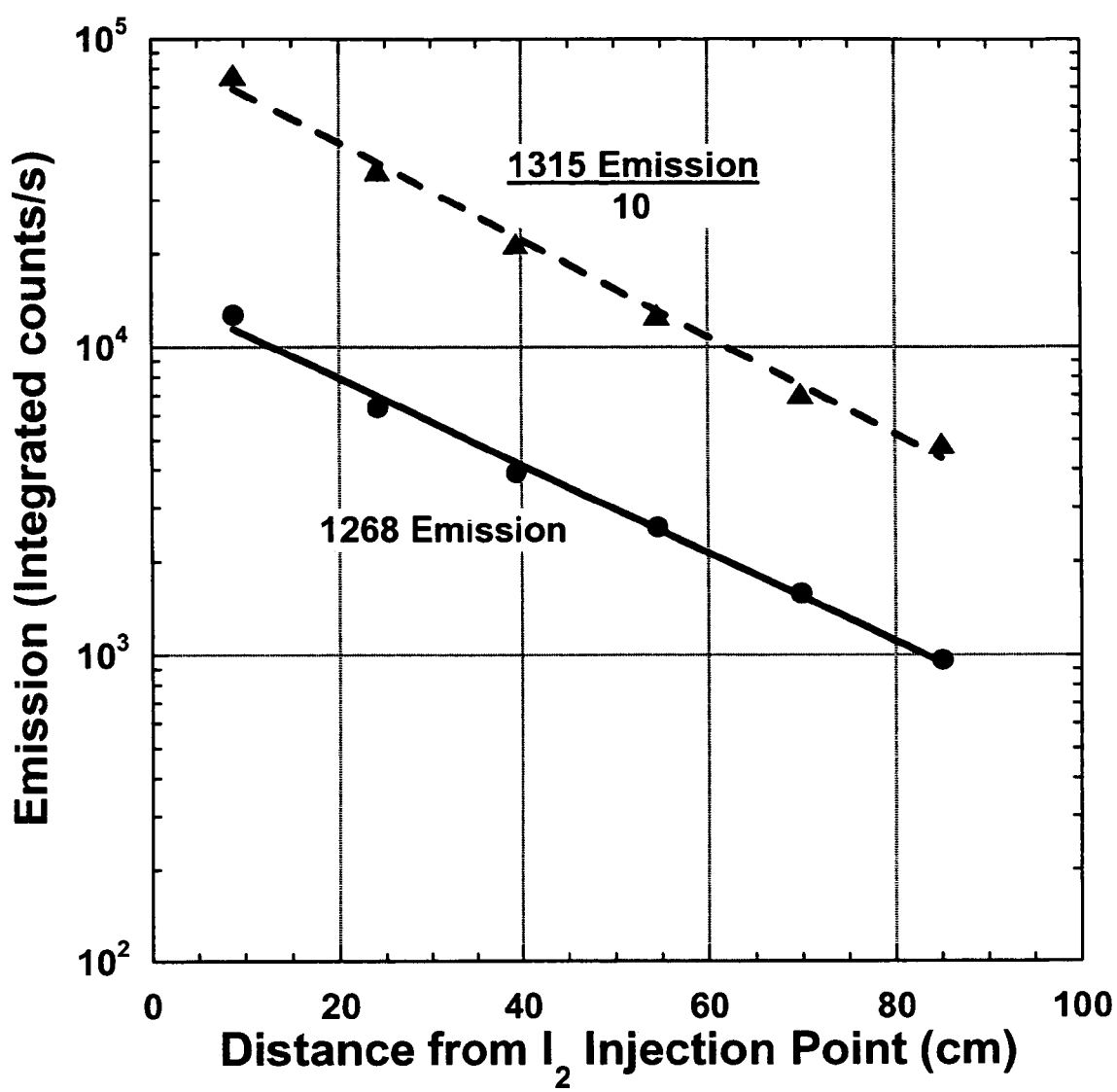
FIG. 8 is a plot of $O_2(a)$ (1268 μm) and I* (1315 μm) emission versus distance from the $I_2$ injection point for a primary discharge flow of 4 mmol/s of $O_2$ mixed with 16 mmol/s of He at a pressure of 10 torr. A secondary flow of 0.008 mmol/s of $I_2$ and 2 mmol/s of He was injected at x=0. The rf power was 400 W. (Note that the 1315 emission signal has been divided by a factor of 10.)

In an effort to establish a better estimate for the rate constant for reaction (4), the emissions of $O_2(a)$ and I* were monitored as a function of the distance from the plane of the $I_2$ injection and is presented in FIG. 8. The data show that the two signals decay by a significant amount with a simple exponential decay. Both appear to have the same approximate spatial decay rate, which is an indication of the near equilibrium between $O_2(a)$ and I* via the forward and backward rates associated with reaction (1).

It is shown below that the data illustrated in FIG. 8 coupled with measurements of the oxygen atom concentration and the initial $O_2(a)$ concentration determined by a known technique outlined by W. T. Rawlins disclosed in "Optical Diagnostics and Kinetics of Discharge-Initiated Oxygen-Iodine Energy Transfer", one can obtain a first order estimate of the rate coefficient for the deactivation of I* to I from Eq. (1.7).

One can use the fact that the decay of $O_2(a)$ and I* are simple exponentials of the flow distance z to obtain an estimate for the I*+O quenching reaction rate $k_4$.

$$\frac{d[I^*]}{dz} = \frac{1}{u_f} \cdot \frac{d[I^*]}{dt} \tag{1.A-1}$$
$$= \frac{k_1[O_2(a)][I]}{u_f} - \frac{k_{-1}[O_2(X)][I^*]}{u_f} - \frac{k_4[O][I^*]}{u_f},$$

$$\frac{d[O_2(a)]}{dz} = \frac{1}{u_f} \cdot \frac{d[O_2(a)]}{dt} \tag{1.A-2}$$
$$= -\frac{k_1[O_2(a)][I]}{u_f} + \frac{k_{-1}[O_2(X)][I^*]}{u_f}.$$

By adding equations (A-1) and (A-2), recognizing that the first two terms of the right hand side of each equation cancel exactly, and using the fact that $[O_2(a)]>>[I^*]$, one can obtain

$$\frac{d\{[O_2(a)]+[I^*]\}}{dz} \cong \frac{d[O_2(a)]}{dz} = -\frac{k_4[O][I^*]}{u_f}. \tag{1.A-3}$$

Both $[O_2(a)]$ and $[I^*]$ decay exponentially (FIG. 8) with approximately the same spatial rate, hence the concentrations take the functional form of $[O_2(a)](z)=[O_2(a)]_0 \exp(-z/L)$ and $[I^*](z)=[I^*]_0 \exp(-z/L)$, where L is the characteristic exponential decay length, and equation (1.A-3) can be written as $$\frac{d[O_2(a)]}{dz} = -\frac{1}{L}[O_2(a)]_0 \exp\left(-\frac{z}{L}\right) \tag{1.A-4}$$
$$= -\frac{k_4[O]}{u_f}[I^*]_0 \exp\left(-\frac{z}{L}\right).$$

Solving for $k_4$ gives,

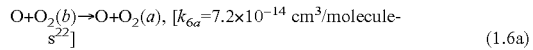
$$k_4 = \frac{[O_2(a)]_0}{[O]_0[I^*]_0} \cdot \frac{u_f}{L}. \tag{1.7}$$

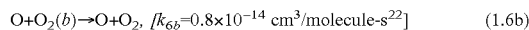

Here, $u_f$ is the flow velocity and the subscript "0" indicates the concentration of the various species at the plane of iodine injection (with the assumption that the molecular iodine is dissociated immediately by the O atoms) with spatial variation of $O_2(a)$ and I* being exp(-z/L) in agreement with FIG. 8. For the 10 torr case illustrated in FIG. 8 having an estimated $O_2(a)$ yield of 15% (at the $I_2$ injection point), a temperature of 375 K from the gain diagnostic and hence an equilibrium constant $K_{eq}=2.19$, an oxygen atom density of $3.72\times10^{15}$ cm$^{-3}$, an $O_2(a)$ concentration of $6.70\times10^{15}$ cm$^{-3}$, $[I]+[I^*]$ of $1.86\times10^{14}$ cm$^{-3}$ and thus $[I^*]$ of $4.60\times10^{13}$ cm$^{-3}$ [from $K_{eq}$ and an $O_2(a)$ yield of 15%], a flow velocity of 2633 cm/s and L of 30.5 cm from FIG. 8 gives $$k_4=3.4\times10^{-12} \text{ cm}^3/\text{molecule-s}, \tag{1.8}$$

which is higher than the upper bound of $2\times10^{-12}$ cm$^3$/molecule-s estimated by others. The simple exponential deactivation of O$_2$(a) and I* suggests a simple deactivation process as expressed by reaction (1.4).

Figure 9:
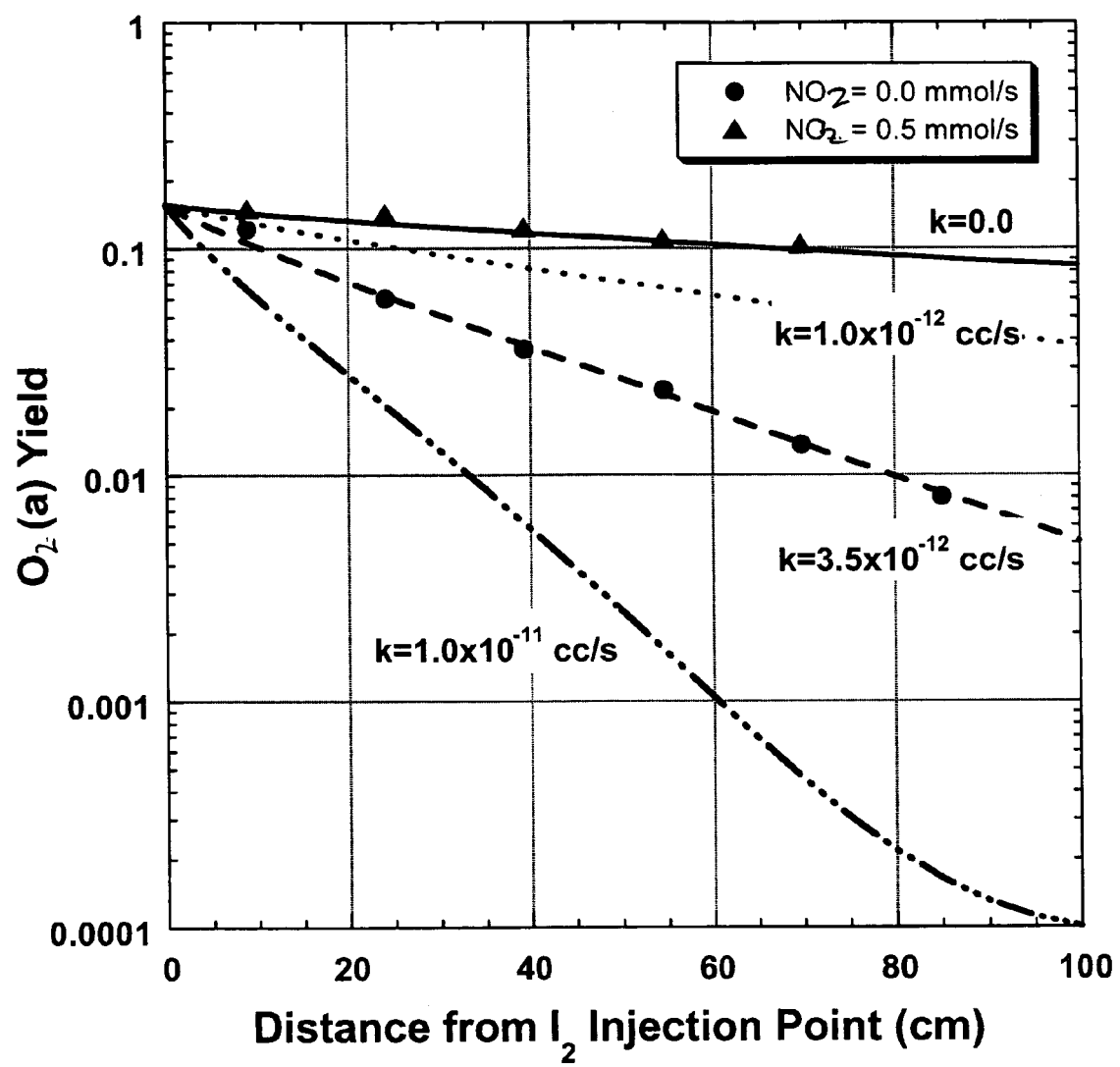
FIG. 9 is a plot of $O_2(a)$ yield versus distance from the $I_2$ injection point. Experimental data are compared with Blaze II predictions for differing I*+O reaction rates for a flow of 4 mmol/s of $O_2$ mixed with 16 mmol/s of He at a pressure of 10 torr. A secondary flow of 0.008 mmol/s of $I_2$ and 2 mmol/s of He was injected at x=0. The rf power was 400 W. Data were taken without $NO_2$ and with 0.5 mmol/s of $NO_2$.

For another estimate (including all the known post-discharge kinetics), the O$_2$(a) data illustrated in FIG. 8 were converted to yield and Blaze II simulations were run to determine an estimate of the I*+O rate constant, FIG. 9. Experimental data were also taken for an over-titrated situation where the NO$_2$ flow was 0.5 mmol/s (from FIG. 3 the O atom flow rate for these conditions was approximately 0.32 mmol/s) to simulate the case where the I*+O rate was zero, or equivalently when there are zero oxygen atoms. FIG. 9 indicates that the rate for I*+O is approximately $3.5\times10^{-12}$ cm$^3$/molecule-s, which is significantly higher than the upper bound of $2\times10^{-12}$ cm$^3$/molecule-s estimated in the prior art. Based upon our experiments and analyses, the rate for I*+O appears to be approximately $3.5\times10^{-12}$ cm$^3$/molecule-s. Since the measurement by Han et al. is a more direct measurement of the rate, it is currently believed that the estimate of $3.5\times10^{-12}$ cm$^3$/molecule-s determined in this work may be representative of a more global loss mechanism that is still not fully understood. The fact that the Blaze prediction with a zero rate matches the over-titrated data reasonably well supports the conclusion that the presence of O atoms in the flow is not helpful when atomic iodine is also present; however, this still does not mean that the I*+O process, reaction (4), is the only significant loss mechanism.

Other possible quenchers of I* that have been considered are NO$_2$, NO, IO, and O$_3$. The I*+NO$_2$ rate was measured to have an upper bound of $8.5\times10^{-14}$ cm$^3$/molecule-s and the rate by NO is $1.2\times10^{-13}$ cm$^3$/molecule-s but neither of these rates is large enough to compete with the I*+O quenching rate. Further, if NO were a significant quencher of I*, then it would be expected to see a more pronounced quenching effect as the NO$_2$ titration flow rate was increased (NO and O$_2$ are the products of the NO$_2$+O titration reaction); therefore we do not believe that NO is of significance as an I* quencher for these gas mixture and flow conditions. The IO self removal reaction IO+IO→2I+O$_2$ is fast, $8.2\times10^{-11}$ cm$^3$/molecule-s but the predicted concentrations are too small for IO to play any significant role in quenching I*. The quenching rate of ozone is not known, but based upon predicted concentrations, the quenching rate with ozone would have to be two orders of magnitude larger than the quenching rate of O for the ozone reaction to compete. It is also possible that the sum of the effects of lesser quenchers is adding up to a level that competes with the O atoms; further studies need to be conducted to validate or refute this possibility. Regardless of the quenching mechanism, data clearly indicates that it is important to control the quantity of atomic oxygen in the flow prior to injecting iodine into the flow.

Figure 10:
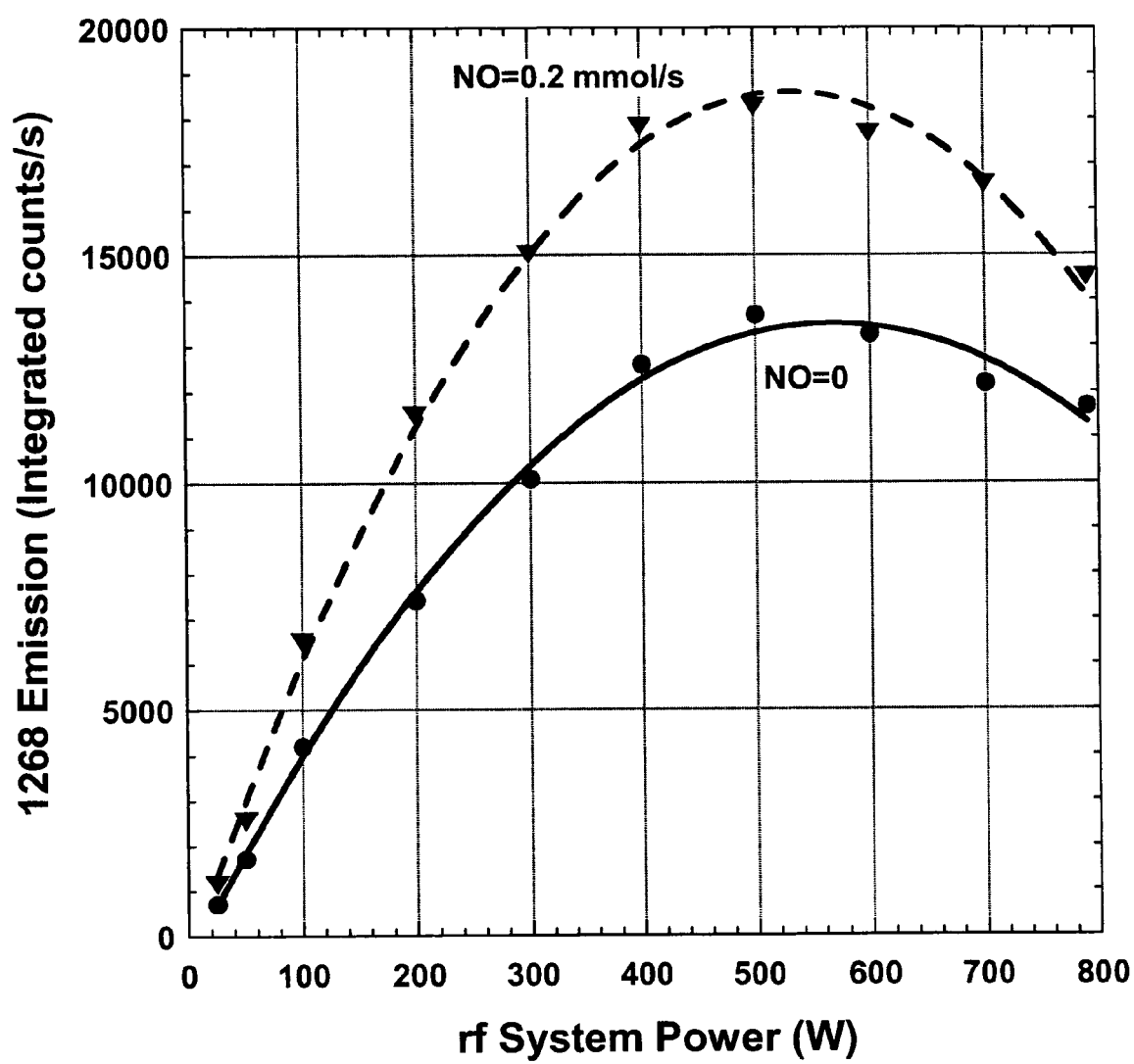
FIG. 10 is a plot of $O_2(a)$ emission at 1268 μm with and without NO at the subsonic diagnostic port as a function of system power, for a flow of 5 mmol/s of $O_2$ mixed with 20 mmol/s of He at a pressure of 10 torr.

It is also important to lower the parameter E/N such that it is close(r) to the optimal excitation cross-section value to attain maximal yields of O$_2$(a). One way to lower E/N is to introduce a gas with a lower ionization threshold. Experiments were conducted by adding NO to the flow, since NO has an ionization threshold of 9.26 eV, which is significantly lower than 12.07 eV threshold of O$_2$. It was found that NO additions into the initial gas mixing section 115 of approximately 1-10% of the O$_2$ flow rate produced the largest increases in the production of O$_2$(a) and typically around 4-5% was optimal. FIG. 10 shows the significant improvement (~33%) attained with a 4% (0.2 mmol/s) addition of NO in a flow of 5 mmol/s of O$_2$ mixed with 20 mmol/s of He at 10 torr total pressure. It is believed that the principle cause of this increase is a drop in E/N, which shows up as a drop in the measured rf voltage, FIG. 11, however there are likely other effects of having NO in the discharge as well.

If one assumes a constant field from electrode to electrode and a constant current, it is estimated that E/N is 12-18 Td whereas the optimal E/N is approximately 5 Td. While FIG. 11 does not show a large change in voltage, it does not take a large change in E/N to make observably large changes in the O$_2$(a) production since the embodiment operates in the steep part of the electron energy distribution function curve. While the type of discharge would be classically considered a self-sustained discharge, it appears to be operating in a non-self-sustained fashion because E/N of approximately 15 Td is considerably lower than a predicted self-sustained E/N of approximately 80 Td. The reason for this is believed to do with the VUV emission in the hollow cathode part of the discharge causing photo-ionization downstream and hence lowering the. E/N from the classic mode. It is also true that the lower E/N is a consequence of an average of the non-uniform distribution of E$_z$ due to capacitive shunting of the rf currents to ground. Thus, the plane of the driven electrode has a much higher E/N.

Several flow conditions were found that resulted in positive gain using the configuration shown in FIG. 1. A typical set of conditions is 4 mmol/s of O$_2$ mixed with 16 mmol/s of He and 0.2 mmol/s of NO flowing through a 400 W rf discharge. An additional 0.2 mmol/s of NO$_2$ was added downstream to scavenge some of the excess O atoms, followed by injection of a secondary stream of 0.008 mmol/s of I$_2$ with 2.0 mmol/s of secondary He diluent. To raise the pressure for more ideal nozzle performance with the present vacuum system, 20 mmol/s of Ar was injected further downstream. The pressures in the subsonic diagnostic duct and in the supersonic diagnostic cavity were 10.6 torr and 1.6 torr, respectively.

Figure 13:
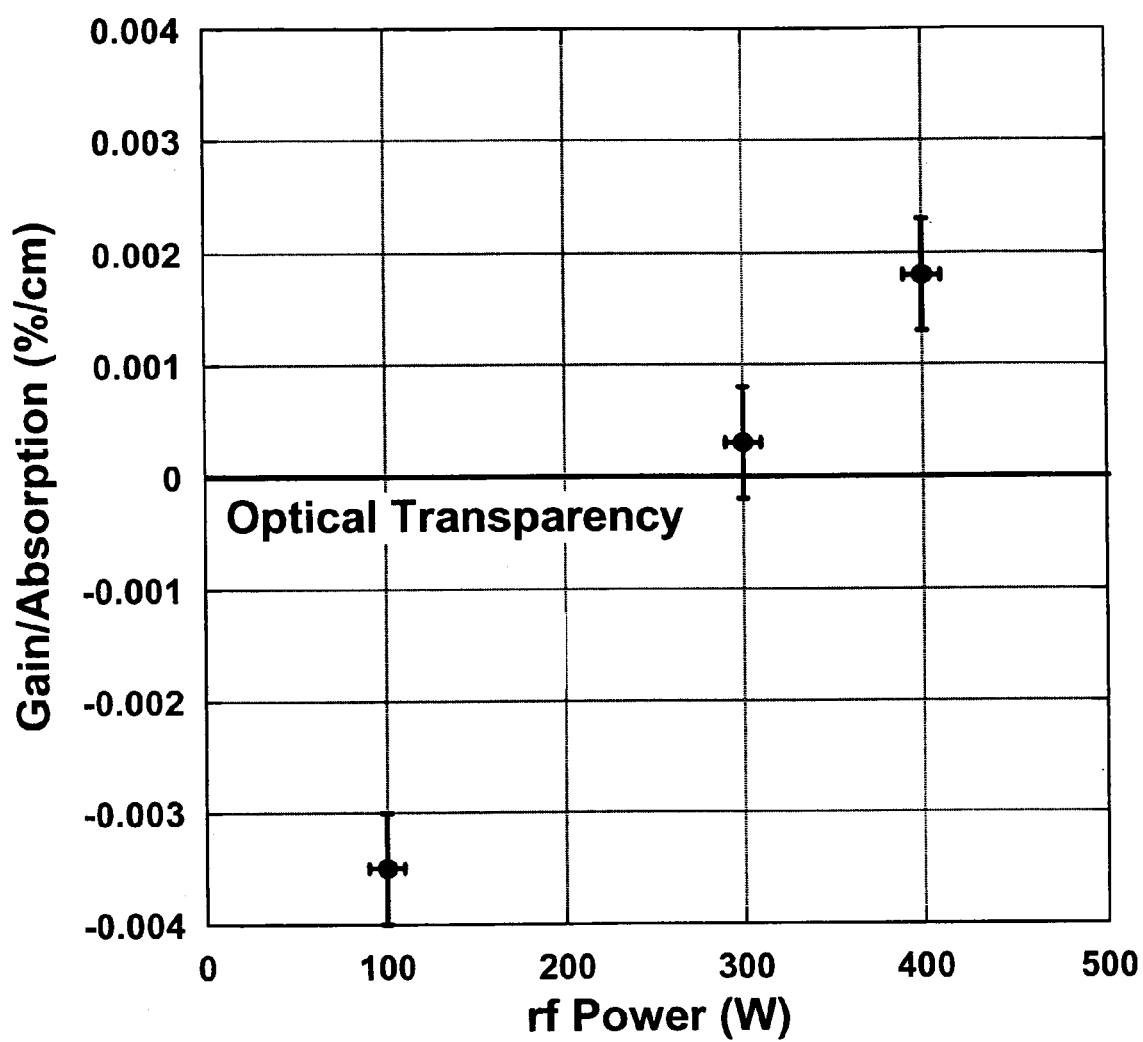
FIG. 13 is a plot of gain in the supersonic cavity as a function of rf discharge power.

Absorption in the subsonic region for these conditions was −0.009% cm$^{-1}$, with a temperature of 400 K, and an O$_2$(a) yield of approximately 15%. Based on these measurements, positive gain could be expected if the gas temperature could be sufficiently reduced. As such, gain measurements in the supersonic cavity were made for the above flow conditions as shown in FIGS. 12 and 13. With 100 W of rf discharge power and a yield of approximately 5% only absorption was observed. Upon raising the discharge power to 400 W, positive gain of ≈0.002% cm$^{-1}$ was measured. The measured lineshapes were digitally filtered (FIG. 12b) and then corrected for homogeneous broadening due to He, Ar, and O$_2$ to obtain the Doppler width. From the resulting Doppler width, we obtain a temperature of ≈210 K at 100 W and ≈240 K at 400 W in the supersonic region. To our knowledge, these were the first measurements of positive gain in a continuously flowing iodine system with O$_2$(a) being provided by an electric discharge. Interestingly, the first measurement of positive gain on a classic liquid chemistry COIL system was also on the order of 0.001% cm$^{-1}$.

By adding pre-cooled (≈180 K) Ar upstream of the nozzle throat and raising the upstream pressure to 13 torr we were able to make further improvements to the gain by lowering the total temperature and increasing the density. FIG. 14 shows both a positive gain trace in the supersonic cavity and the corresponding absorption trace in the subsonic cavity. The flow conditions were the same for this case as discussed above with the exception of raising the Ar flow rate to 38 mmol/s of Ar to raise the upstream total pressure to 13 torr. The gain in the supersonic cavity was measured to be ≈0.005% cm$^{-1}$ at 400 W of rf discharge power. From the digitally filtered traces (FIG. 14b) and the homogeneous broadening correction, temperatures of ≈220 K in the supersonic cavity and ≈375 K in the subsonic region were obtained. Similar magnitudes of positive gain using pre-cooled $N_2$ upstream of the nozzle throat were obtained; for these cases the temperature of the $N_2$ entering the flow tube was ≈150 K and the flow rate was 50 mmol/s of $N_2$ to raise the pressure to 12.5 torr.

For the first embodiment, conditions for positive gain were established on the I*→I electronic transition of the iodine atom at 1315 μm pumped by a near resonant energy transfer from $O_2(a)$ produced in an electric rf discharge. A supersonic cavity was employed to lower the temperature of the flow and reduce the effect of the backward pumping reaction. This produced sufficient population inversion to observe a small, but easily identifiable positive gain of approximately 0.005% $cm^{-1}$. The critical issues that needed to be addressed to attain positive gain were improvements to the discharge flow and stability, along with a significantly more complete understanding of the gas phase kinetics. Atomic oxygen was found to play both a positive role and a deleterious role in this system, and as such the excess atomic oxygen was controlled to minimize the deleterious effects. The discharge production of $O_2(a)$ was enhanced by the addition of a small proportion (4-5% of the $O_2$ flow rate) of NO to lower the ionization threshold of the gas mixture.

Figure 15:
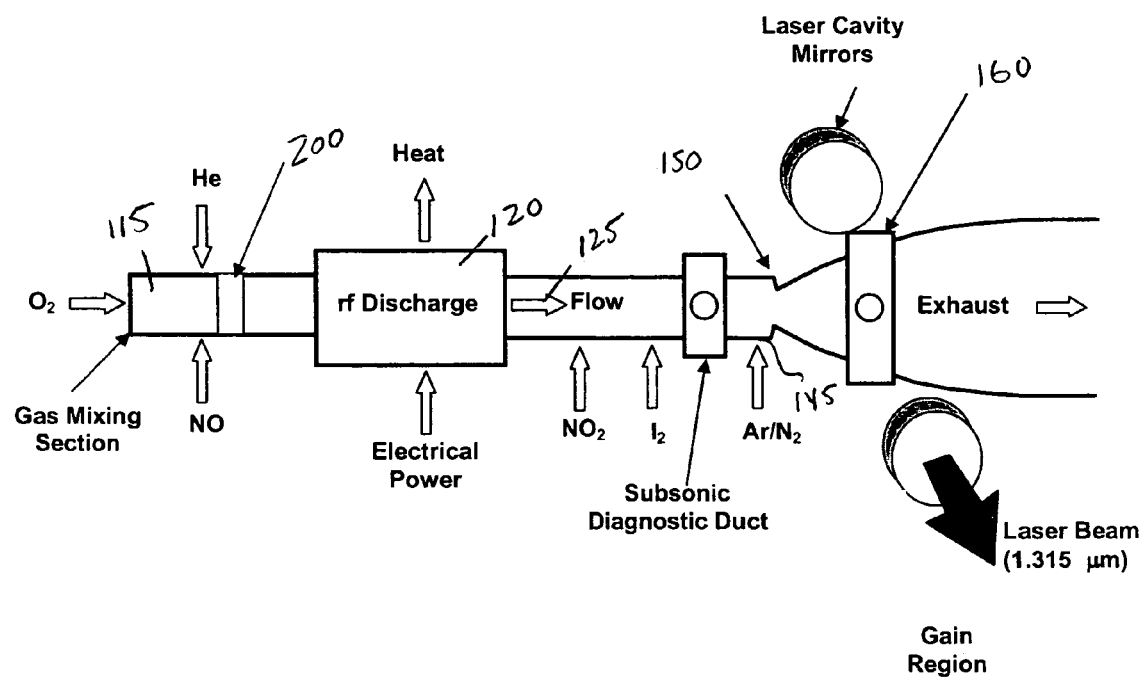
FIG. 15 is a schematic of the OIL laser system in accordance to a first embodiment that further includes a flow conditioner.
Figure 16:
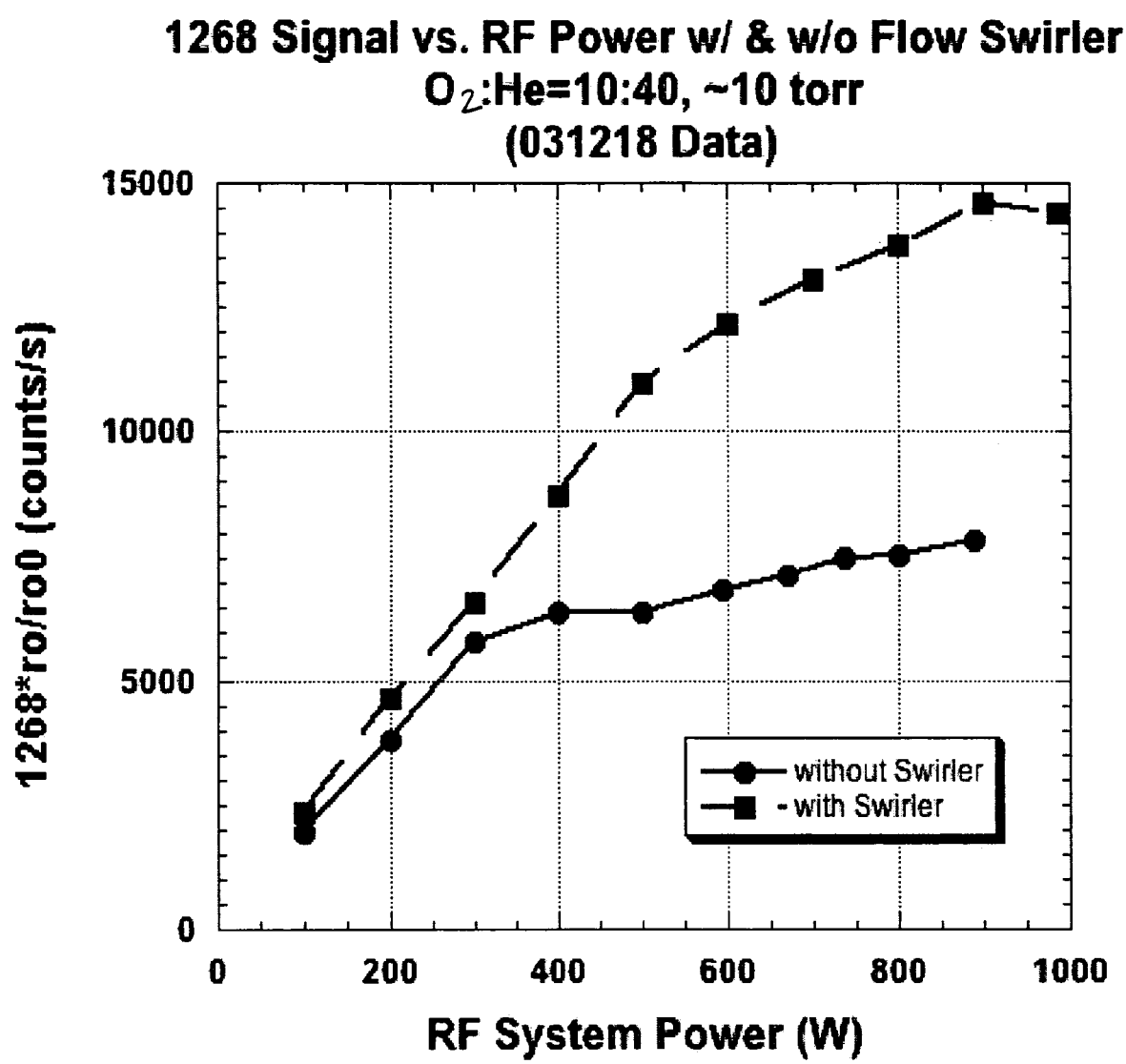
FIG. 16 is a plot that shows significant improvement in $O_2(a)$=1268 emission with the conditioning means at higher power due to greater discharge stability.

Referring now to FIG. 15, the first embodiment may include numerous advancements to the prior art. First, a gas mixing section 115 is present that has a means to condition the flow 200 prior to entering the gas discharge region 120. The means to condition the flow 200 is added upstream of the active electric discharge region (FIG. 1). The conditioning means helps to improve the mixing of the gases, distribute heat more uniformly in the discharge flow, and prevent arcing in the discharge region, thereby improving discharge stability. More electrical energy is coupled into the singlet delta state of $O_2$ with improved discharge stability, especially at higher power levels. As illustrated in FIG. 16 a significant improvement in $O_2(a)=1268$ emission with the flow conditioner at higher power due to greater discharge stability.

As mentioned above, O atoms play a significant role in reducing the $O_2$ singlet-delta yield when iodine is present. This reduction comes through a chain reaction where $O_2(^1\Delta)+I \rightarrow O_2+I^*$ and $I^*+O \rightarrow I+O$ hence transferring energy from $O_2(^1\Delta)$ to heat in the flow. It is also well known that O atoms are useful for rapidly dissociating the $I_2$ molecule. The second improvement is to use a gas such as $NO_2$ to remove most of the O atoms from the flow to eliminate the detrimental loss from I*+O, while at the same time leaving just enough O atoms to dissociate the $I_2$ molecule (or whatever iodine donor molecule is used in the apparatus, e.g. $CF_3I$ or $CH_3I$ are other possibilities). The $NO_2$ (or other O-atom removal gas) would be injected downstream of the discharge, but upstream of the iodine donor molecule ($I_2$, $CF_3I$, $CH_3I$) injection point. The addition of $NO_2$ may not be a necessary element if the $I_2$ (or iodine donor) is injected near the throat of the supersonic nozzle because the I*+O reaction will have less time to have an effect when injected closer to the laser cavity. Note that the O atoms essentially supplant the need for the "Electrical I-atom Generator" discussed in U.S. Pat. No. 6,501,780. However, it may still be desirable to remove all of the O atoms and to have an "Electrical I-atom Generator."

Figure 17:
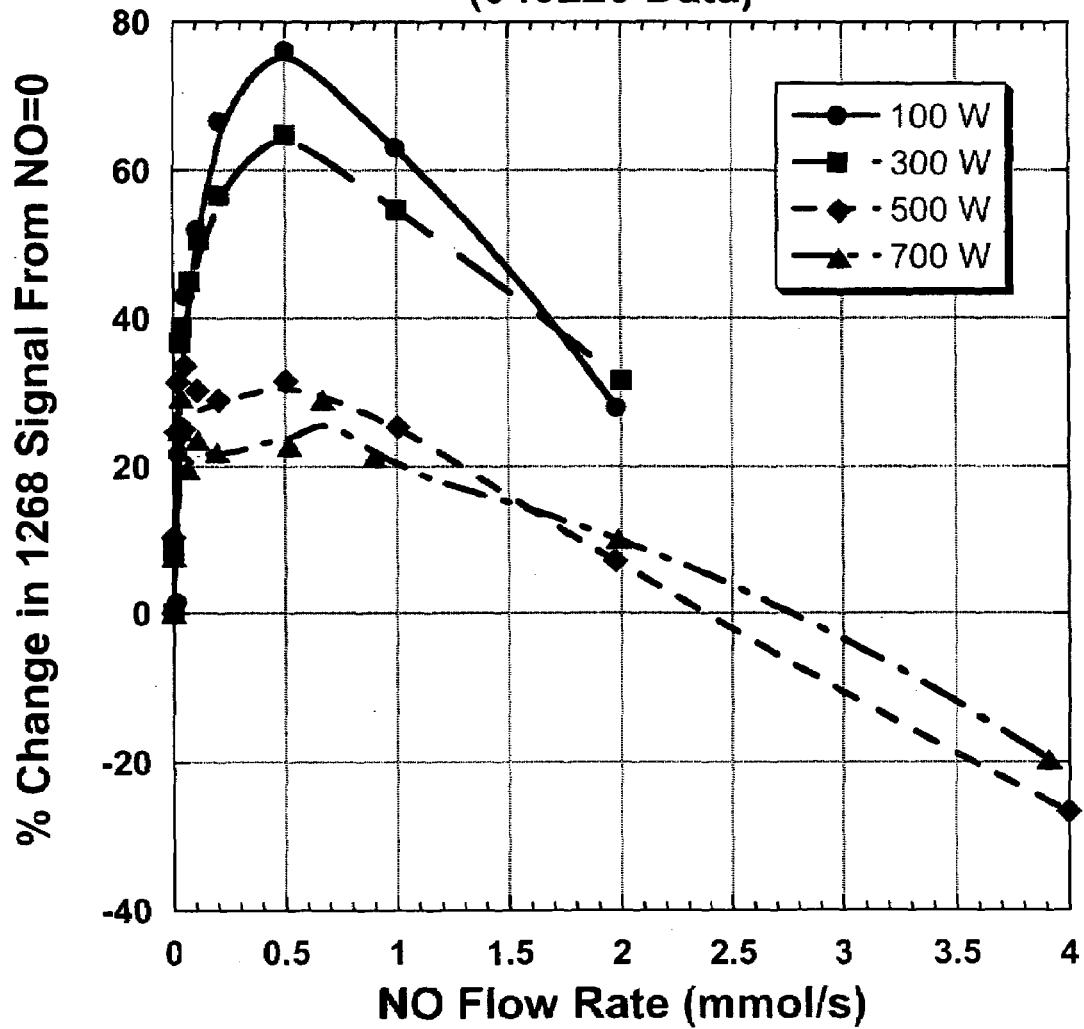
FIG. 17 is a plot that shows ~80% increase in $O_2(a)$=1268 emission at 100 W with NO; ~60% increase at 300 W; ~25% increase at 500 W; and ~15% increase at 700 W.

The third improvement is to utilize a small amount of a gas such as NO (or perhaps other gases such as $NO_2$, $N_2O$, $H_4N_2$, $N_2$, Hg, and $C_4H_4O$) as a "sensitizer" gas for the discharge. The NO would be injected upstream of the discharge, probably, though not necessarily, upstream of the conditioning means. The NO has a lower ionization threshold than does $O_2$, so the NO provides a mechanism by which to provide electrons more easily to the discharge, lowering the voltage and hence the E/N (a parameter of particular interest to electric discharges) of the discharge. Experiments show that a relatively small amount of NO is optimal, approximately 4% of the $O_2$ flow rate (1-10% depending upon conditions). Measurements show increases in singlet-delta signal of 25-86% depending upon the power level used. As shown in FIG. 17, ~80% increase in $O_2(^1\Delta)=1268$ emission at 100 W with NO; ~60% increase at 300 W; ~25% increase at 500 W; and ~15% increase at 700 W.

The fourth improvement is the simultaneous use of small amounts of NO (or an equivalent gas) to enhance the performance of the discharge while at the same time using $NO_2$ (or an equivalent gas) to titrate out most, but not all, of the O atoms. As discussed above, it is important to have just enough O atoms to dissociate the $I_2$ (or other iodine donor), but any excess will rob energy from $O_2(^1\Delta)$ through the chain reaction noted above. As shown in FIG. 4 as $NO_2$ is added, O atoms are removed and the yield of $O_2(^1\Delta)$ increases when iodine is present in the flow.

The fifth improvement is the concept of injecting higher molecular weight diluent (probably Ar or $N_2$) downstream of discharge, but upstream of nozzle to help cool flow and to improve supersonic nozzle performance. The heavier molecular weight diluents hurt discharge performance when they are run through the discharge, but improve the performance of the supersonic nozzle. By injecting this diluent downstream of the discharge, but upstream of the nozzle you gain the ability to cool the post-discharge flow while at the same time increasing the average molecular weight of the gas to improve the performance of the supersonic nozzle. The injection point of this diluent could occur upstream or downstream of the $I_2$ injection point.

These improvements have permitted the demonstration of positive gain in a laboratory device. Positive gain is a necessary condition for attaining an actual laser demonstration. Further research and development was required to improve the magnitude of the gain and to subsequently demonstrate lasing with this concept.

Figure 20:
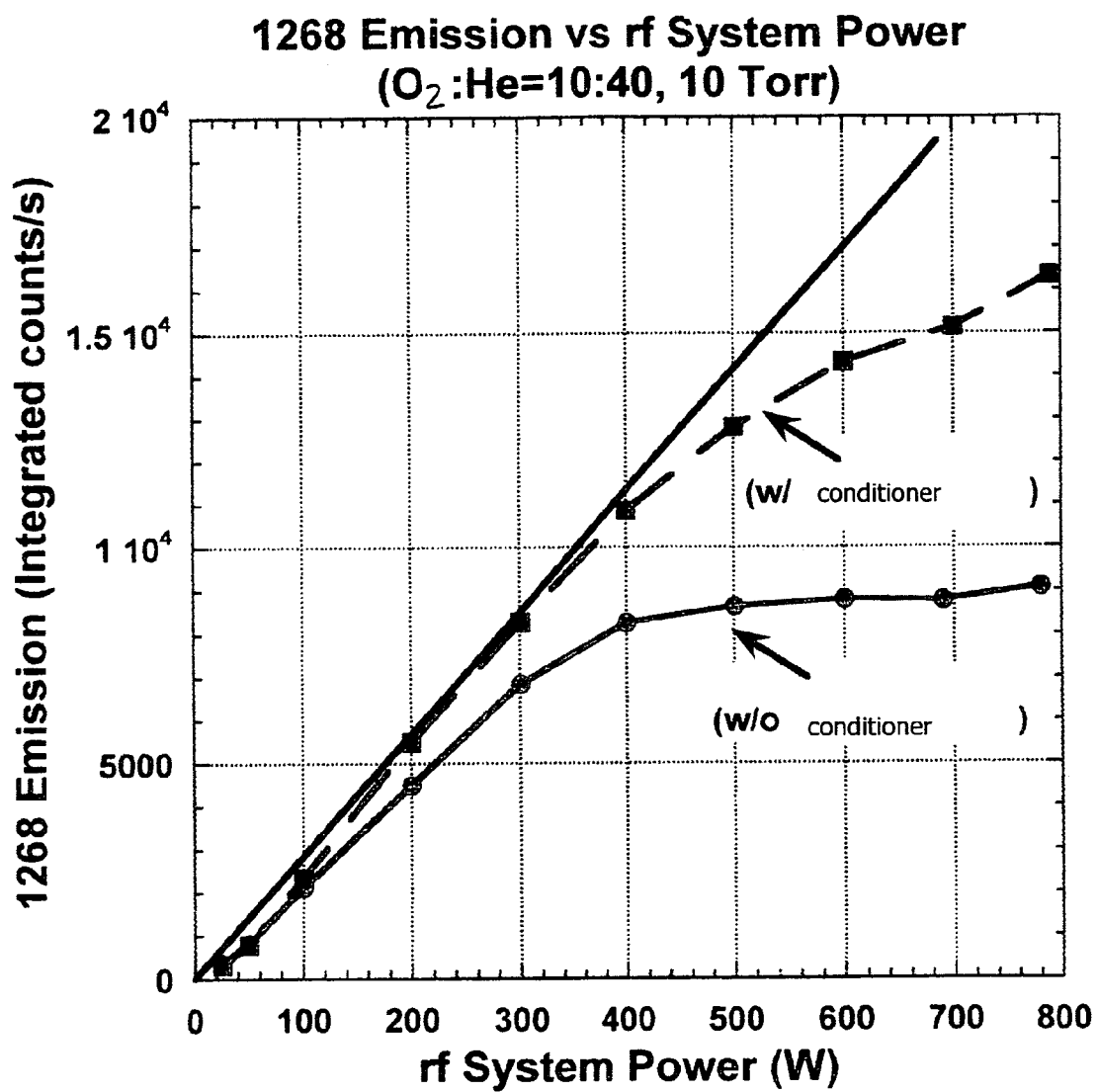
FIG. 20 is a plot that shows 1268 emissions vs rf system power for a system with and without a flow conditioner.

The flow conditioning means 200 serves multiple purposes. It helps to create a vortex or swirl in the flow permitting a more uniform and stable discharge at higher electrical input powers and helps to delay the onset of discharge instabilities. This allows more electrical power into the critical $O_2(a)$ state which later transfers its energy to the Iodine atoms. This occurs because the flow conditioning means provides greater thermal transport to the walls of the discharge tube; a higher rate of gas mixing leading to a more uniform temperature distribution in the discharge which reduces (or delays) the onset of thermal constriction or arcing of the discharge thus enhancing the stability of the discharge; and greater mixing properties of the gases to enhance the transfer of energy from electrons into the desired excited states of $O_2(a)$ and $O_2(b)$. FIG. 20 shows that the 1268 emission increases with a flow conditioner.

Referring now to FIGS. 18a through 19c two different conditioning means are purposed and either one may be used throughout the invention. A first conditioning means is illustrated in FIGS. 18a through 18c, the first conditioning means 200 includes a block that is sized to fit within the gas mixing section 115. The block has a first face 202 facing upstream and a second face 208 facing downstream. The block further includes at least two channels 205 bored through the block 200. Each channel 205 has an entrance 210 on the first face that is coupled to an exit 215 on the second face, which permits the flow to move through the block 200. Each channel is disposed at an angle α offset from an axis that is parallel to a longitudinal axis β of the gas mixing section 115. The number of channels and the axis may be changed without deviating from the scope of the present invention. However, the angle is preferably about 45° and there is preferably two rows of channels positioned in a circular layout. The gases as they exit the channels are moving in a swirled arrangement providing the added benefits discussed above. Lastly, in a preferred embodiment, the block is sized such that the flow must pass through the channels to progress downstream, meaning that the flow would not normally be able to move around the outside perimeter of the block as the outside perimeter of the block 200 would be secured to the inside perimeter of the gas mixing section 115.

Figure 19A:
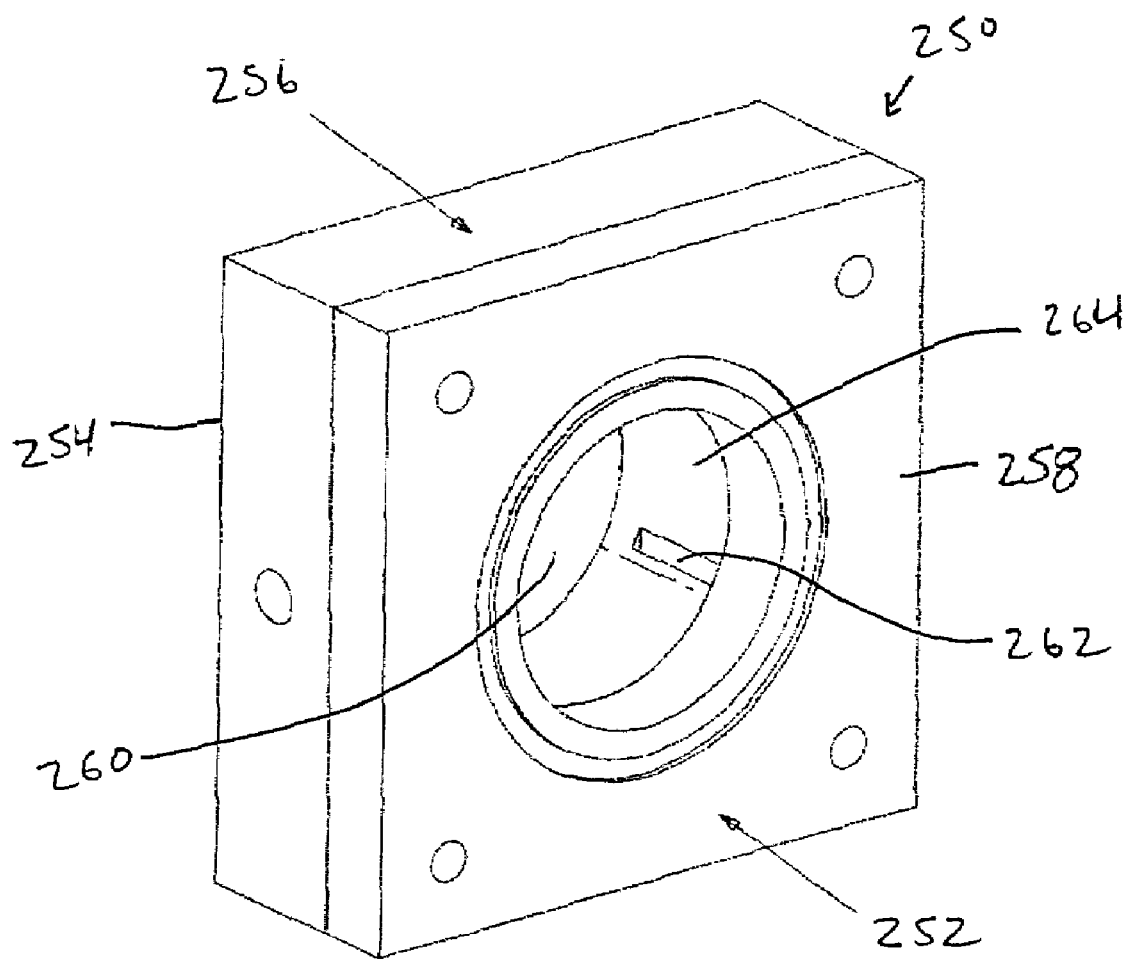

A second conditioning means is illustrated in FIGS. 19a through 19g. The second conditioning means is a tangential swirler 250. The tangential swirler 250 includes a first face 252 positioned upstream of the flow mixing section and a second face 254 positioned downstream of the flow mixing section. The tangential swirler 250 is made up of a main block 256 and a cap 258 that are secured together. A bore 260 is made through the center of the tangential swirler 250 along with at least one tangential injection port 262 that permits a gas to be injected tangentially to the wall 264 of the bore and into the flow moving therethrough. As shown in FIG. 19c, a gas is introduced into the swirler 250 from an inlet 266. The inlet 266 is preferable accessible from outside the gas mixing section such that a gas such as He, NO or $O_2$ can be introduced into the flow. The gas flows from the inlet 266 into a first annular channel 268. The annular channel opens into at least one tangential injection port 262 that is tangentially opened to the inside wall 264 of the bore 260. Preferably the tangential swirler 250 includes four injection ports 262 to permit a more uniform injection of the gas into the flow.

In a second embodiment a continuous wave laser at 1315 μm was produced on the $I(^2P_{1/2}) \rightarrow I(^2P_{3/2})$ transition of atomic iodine using the $O_2(a^1\Delta)$ to pump the iodine which was produced by a radio frequency excited electric discharge. The electric discharge was sustained in $He/O_2$ and $Ar/O_2$ gas mixtures upstream of a supersonic cavity which is employed to lower the temperature of the continuous gas flow and shift the equilibrium of atomic iodine in favor of the $I(^2P_{1/2})$ state. The results of a second embodiment for several different flow conditions, discharge arrangements, and mirror sets are presented. The highest laser output power obtained in these experiments was 520 mW in a stable cavity composed of two 99.995% reflective mirrors.

The set up is similar to the first embodiment. It is further noted that separate electrical measurements indicate that approximately 80-90% of the system power is actually absorbed by the plasma for the $O_2$:He=1:4 mixtures for both the longitudinal and inductive discharges. Measurements of the $O_2(a)$ yield {defined as Y=$O_2(a)/[O_2(X)+O_2(a)]$} were obtained from the gain measurements, and the relative values of the spectral intensities measured for I* to $O_2(a)$ using known techniques.

Laser power measurements were made with a Scientech Astral™ model AC2500/AC25H calorimeter interfaced to a Scientech Vector™ model S310 readout, and were made at the same location in the supersonic laser cavity as were the gain measurements. The gain measurements were made first. The vacuum mirror mounts were then installed for the laser power. Different sets of mirrors (discussed below) formed a stable optical cavity. The mirrors were separated by 38 cm. An Infrared (IR) Detection Card from New Focus, Model 5842, with response between 800-1600 μm, was also used to observe the intensity profile of the beam.

The choice of mirror reflectivities was based on previous measurements of gain. For laser oscillations to occur, the gain coefficient at line center $\gamma_0(\nu_0)$ must satisfy $$\gamma_0(\nu_0) \geq \frac{1}{2l_g}\ln\left(\frac{1}{R_1 R_2}\right) \equiv \gamma_{th}(\nu_0) \text{ (threshold)} \quad (2.1)$$

where $l_g$ length of the gain medium (5 cm for our experiment) and $R_1$ and $R_2$ are the mirror reflectivities. For similar flow conditions previous gains were obtained of about ≈0.005% cm$^{-1}$. With these values of gain and gain length, laser oscillation requires mirrors having reflectivity exceeding $R_1R_2$=0.99950, or $R_1$=$R_2$=0.99975. Based upon this requirement, mirrors were obtained having a reflectivity of R>0.9998.

Different sets of mirrors with 1 m and 2 m radii of curvature as well as two flats, were obtained from Los Gatos Research, Inc. (LGR), and AT Films (ATF). Table 1 lists measurements of the transmissivity, T, from which the reflectivity, R, was estimated as 1-T.

TABLE 1

Note that CC indicates a concave mirror.

| Mirror # | Curvature | Manufacturer | Transmissivity, T | Reflectivity, R |
|---|---|---|---|---|
| 1 | 1 m CC | LGR | 0.000135 | 0.999865 |
| 2 | 1 m CC | LGR | 0.000143 | 0.999857 |
| 3 | 2 m CC | LGR | 0.000071 | 0.999929 |
| 4 | 2 m CC | LGR | 0.000070 | 0.999930 |
| 7 | 2 m CC | ATF | 0.000053 | 0.999947 |
| 8 | 2 m CC | ATF | 0.000051 | 0.999949 |

The transmissivity was determined by using the ISD laser diode and measuring the signal from an InGaAs detector coupled to a Stanford Research Systems Lock-in Amplifier Model SR530, with and without the mirror in the probe beam path. The probe beam signal for the transmission measurement was provided by the PSI gain diagnostic at 1315 μm. The transmission measurements were in close agreement with transmission curves provided by the manufacturers.

The first type of discharge implemented for the second embodiment was similar to the first embodiment in that a radio frequency (rf) electric discharge at 13.56 MHz operated between two internal hollow cathode electrodes (each 10 cm long) oriented longitudinally in the same direction as the gas flow. For this longitudinal discharge, the plasma zone was approximately 4.9 cm in diameter and 25 cm long.

Figure 21:
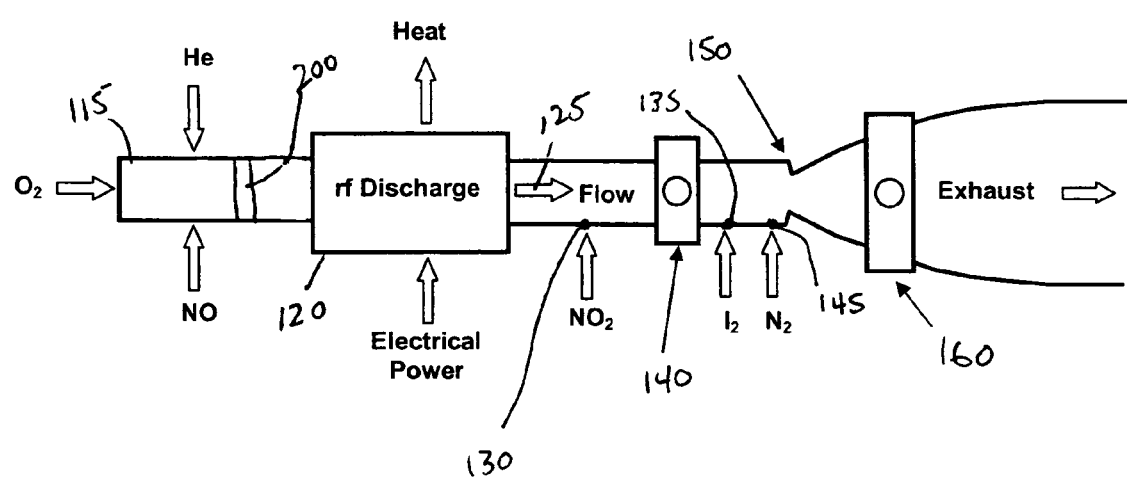
FIG. 21 is a schematic of the experimental apparatus used in the second embodiment.

Many flow conditions were investigated that resulted in gain and lasing using the configuration shown in FIG. 21. The experiments focused on a baseline case consisting of 3.0 mmol/s of $O_2$ mixed with 16.0 mmol/s of He running through the discharge. A tertiary flow of cold $N_2$ gas was injected further downstream to lower the temperature and to raise the pressure to improve the performance of the nozzle with our vacuum system. The discharge production of $O_2(^1\Delta)$ was enhanced by the addition of a small proportion of NO to lower the average ionization threshold and thereby also lower the sustaining value of E/N of the gas mixture therefore most experiments were run with NO in the discharge. (NO has a lower ionization threshold than do $O_2$ and He, thus the addition of NO enhances the production of electrons, which increases the conductivity of the plasma, which reduces the electric field needed to sustain the plasma and consequently E/N is reduced). In earlier experiments that achieved positive gain using slightly different flow conditions, $NO_2$ was used to scavenge excess O atoms therefore some cases were run with $NO_2$ injected downstream of the discharge. The $NO_2$ injector ring was located 17.8 cm downstream from the exit of the longitudinal discharge. The $I_2$ injector ring was located 63.5 cm downstream from the exit of the longitudinal discharge. A tertiary $N_2$ diluent injector ring was located 78.7 cm downstream from the exit of the longitudinal discharge. Details of these experiments are provided herein below.

The first experiment of the second embodiment was run with 3.0 mmol/s of $O_2$ mixed with 16.0 mmol/s of He and 0.15 mmol/s of NO flowing through the rf discharge. For the first experiment, a flow rate of 0.23 mmol/s $NO_2$ was injected downstream and used to scavenge excess O atoms. The $NO_2$ flow was accompanied by 2.0 mmol/s of carrier He diluent. The secondary stream consisted of ≈0.008 mmol/s of $I_2$ with 2.0 mmol/s of secondary He diluent. The tertiary flow was 38 mmol/s of cold $N_2$ gas at a temperature of ≈135 K. The pressures in the subsonic diagnostic duct and in the supersonic diagnostic cavity were 10.4 Torr and 1.35 Torr, respectively.

Figure 22:
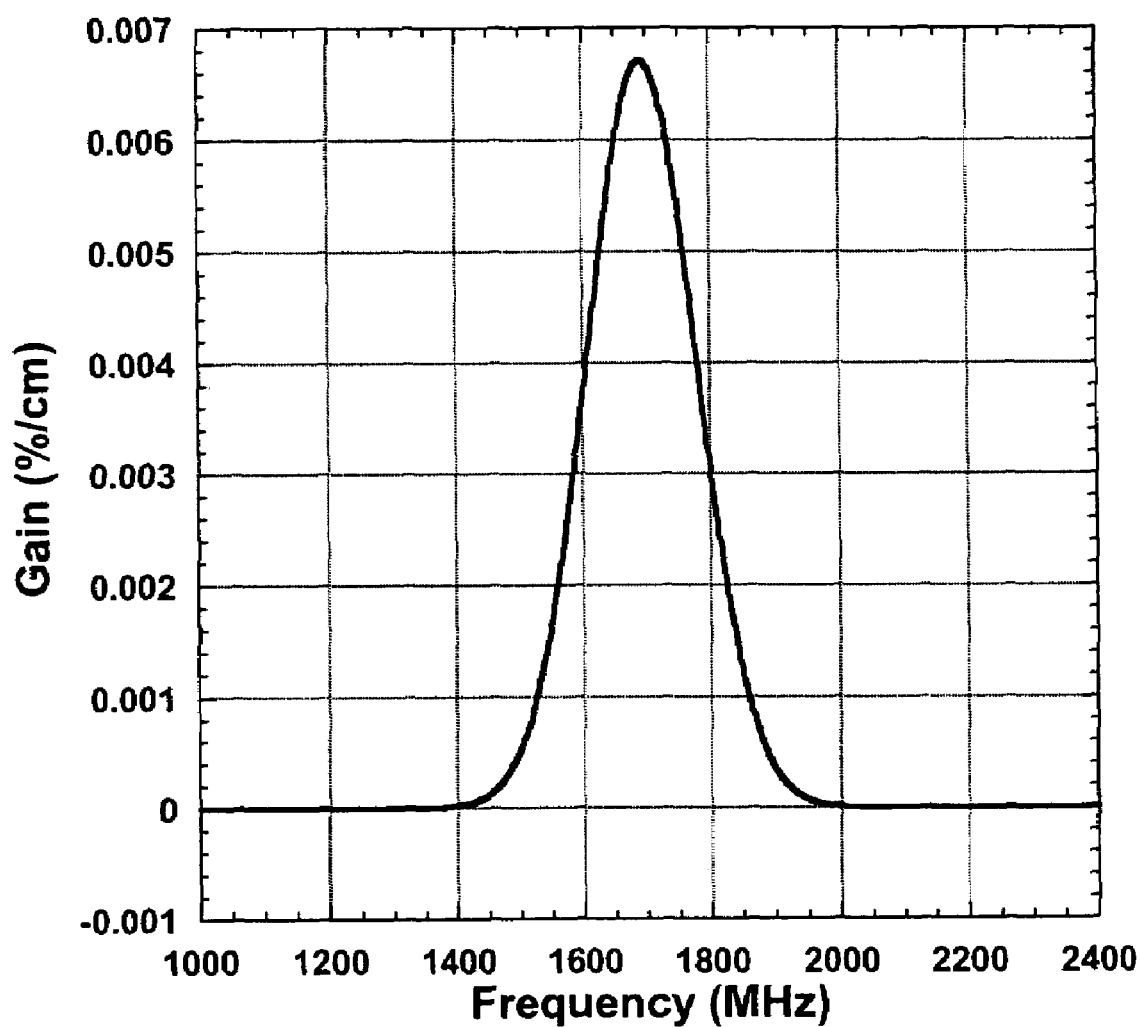
FIG. 22 is a digitally filtered gain signal in the supersonic cavity as a function of laser diode scan frequency measured prior to lasing experiments.

Gain for the above flow conditions at 450 W of rf discharge power is shown in FIG. 22 and peaks at 0.0067% $cm^{-1}$ at line center. The laser resonator was subsequently installed around the supersonic flow cavity and simultaneous measurements of $O_2(a)$ yield and laser power were made using two 1 m concave mirrors with a reflectivity of ≈0.99986, mirrors #1 and #2 from Table 1. For the above flow conditions and 450 W rf power, a laser output power of 178 mW was obtained. The yield of $O_2(a)$ was ≈16% with a temperature of ≈410 K in the subsonic diagnostic duct (upstream of the $N_2$ diluent injection) and a temperature in the supersonic cavity of ≈180 K from the lineshape measurement. The beam shape was circular with a diameter of ≈1.9 cm, the same as the clear aperture of the mirror mounts. For reference, the first measurement of laser action using a classic liquid chemistry COIL system produced 4 mW.

A second run of experiments with the longitudinal rf discharge was conducted with NO in the discharge and without $NO_2$ downstream of the discharge. The conditions used in the first set of these experiments were 3.0 mmol/s of $O_2$ mixed with 16.0 mmol/s of He and 0.15 mmol/s of NO flowing through the rf discharge. The secondary stream consisting of ≈0.008 mmol/s of $I_2$ with 2.0 mmol/s of He diluent was injected 63.5 cm downstream from the exit of the discharge. A tertiary flow of 55 mmol/s of cold $N_2$ gas (≈120 K) was injected further downstream to lower the temperature and to raise the pressure to improve the supersonic nozzle performance. The pressures in the subsonic diagnostic duct and in the supersonic diagnostic cavity were 12.6 Torr and 1.55 Torr, respectively. For these conditions, no additional $NO_2$ was employed to scavenge excess O atoms; in fact, at this slightly higher pressure, adding $NO_2$ was deleterious to laser performance, which may be in part due to a lower O atom production or higher O atom loss rate at these higher pressure conditions.

Figure 23:
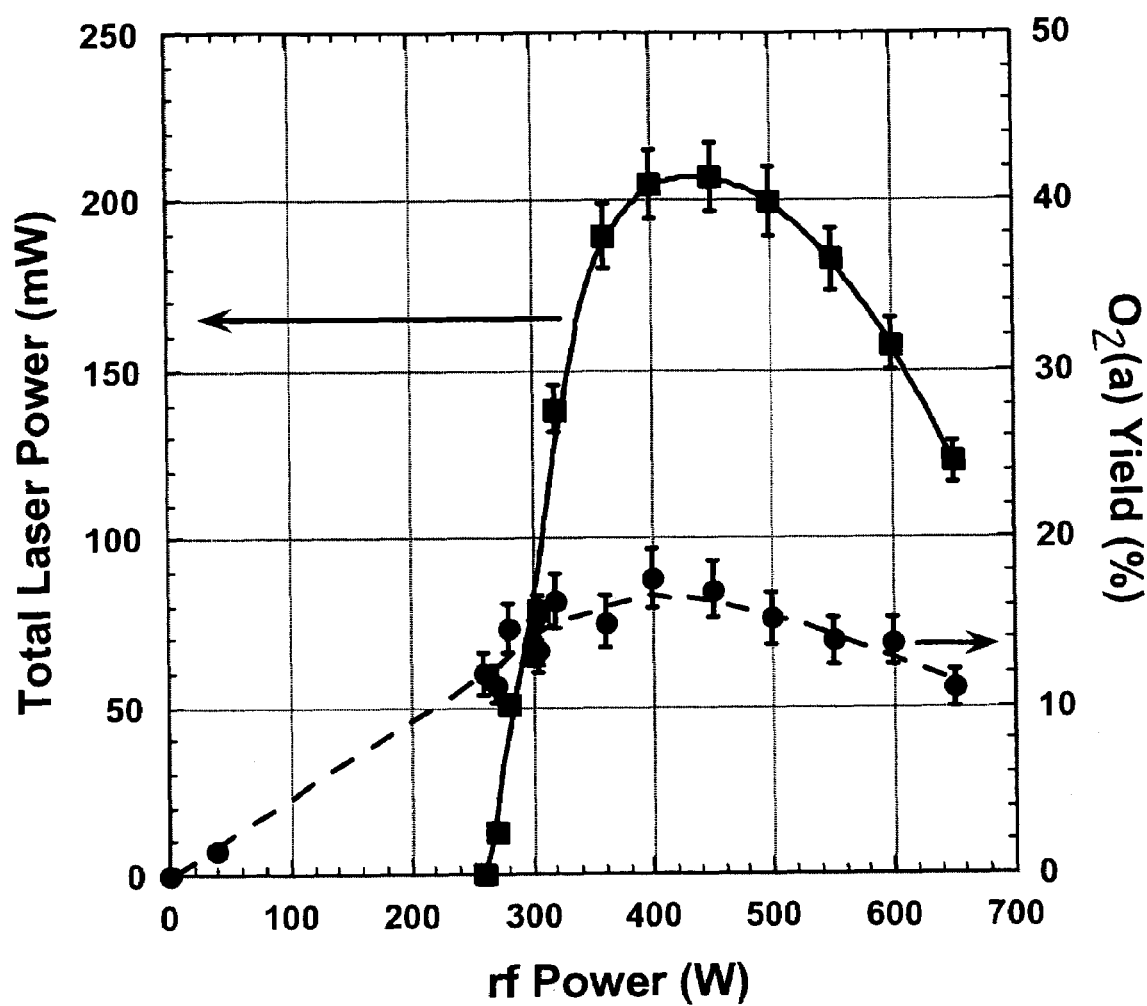
FIG. 23 illustrates $O_2(a)$ yield in the subsonic diagnostic section and total outcoupled laser power in the supersonic cavity as a function of rf discharge power. Subsonic flow tube pressure of 10 torr.

Gain for the above flow conditions at slightly higher pressure and 450 W of rf discharge power is approximately the same as that from the first experiment, shown in FIG. 22, and also peaks at 0.0067% $cm^{-1}$ at line center. The lineshape also indicates a temperature of ≈80 K. The laser resonator was subsequently installed around the supersonic flow cavity and simultaneous measurements of $O_2(a)$ yield and laser power were made as a function of rf discharge power as shown in FIG. 23. For the above flow conditions and 450 W rf power, a laser output power of 207 mW was obtained. The yield of $O_2(a)$ was ≈17% with a temperature of ≈410 K in the subsonic diagnostic duct. (Note that the drop in $O_2(a)$ signal beyond 400 W is believed to be a consequence of discharge instabilities such as thermal constriction that are visible in our discharge under these flow conditions). The beam shape was also circular with a diameter of ≈1.9 cm, the same as the clear aperture of the mirror mounts.

Figure 24:
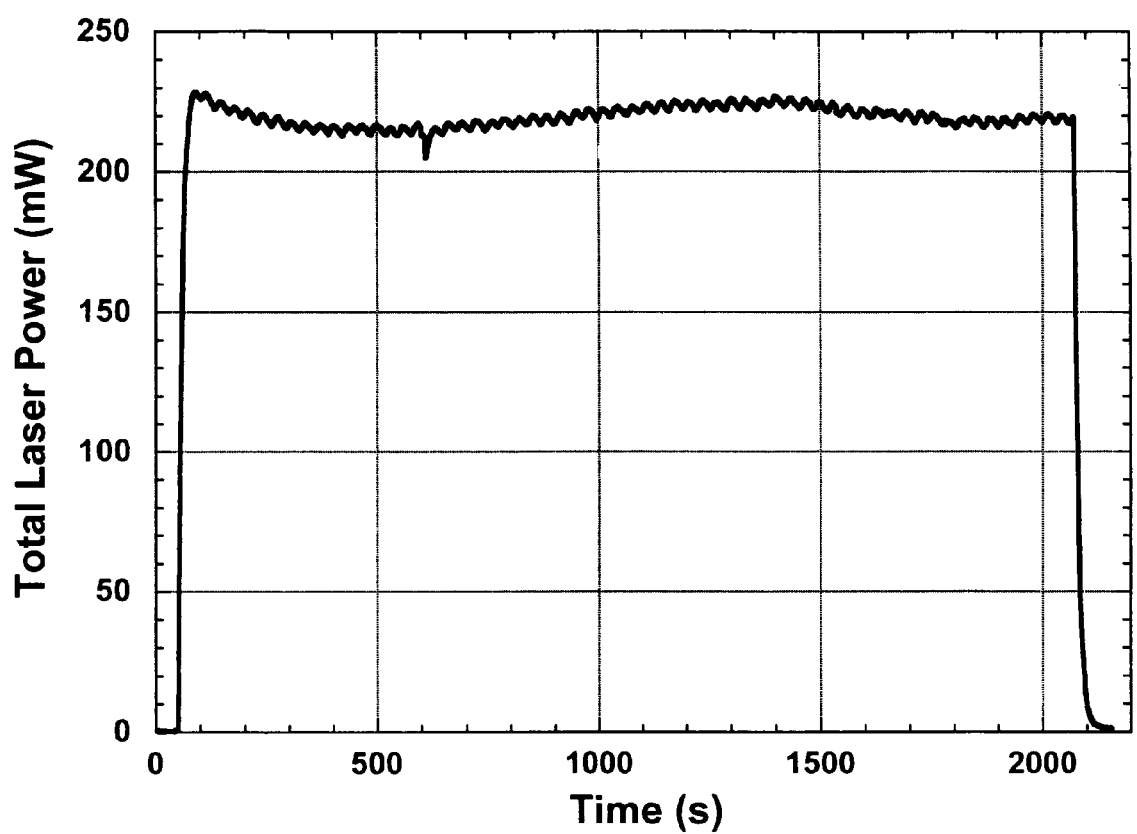
FIG. 24 illustrates continuous wave outcoupled laser power as a function of time.
Figure 25:
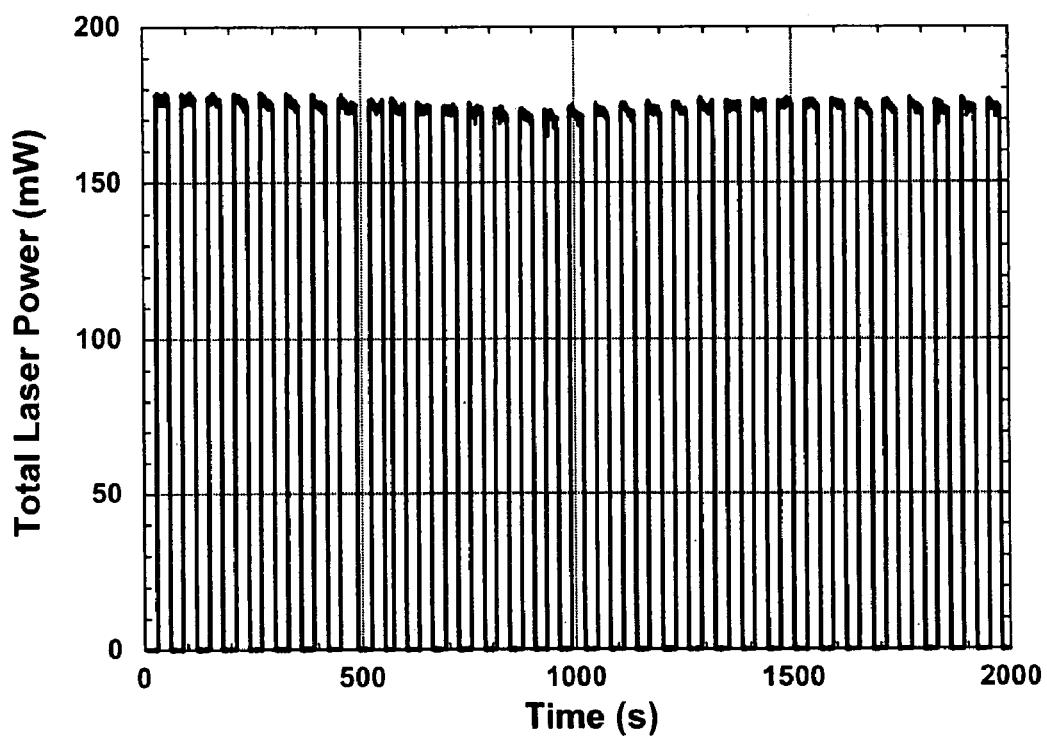
FIGS. 25a and b are plots of Continuous wave cycled laser power as a function of time; (25a) 32 minute time scale, (25b) expanded 8 minute time scale.
Figure 25B:
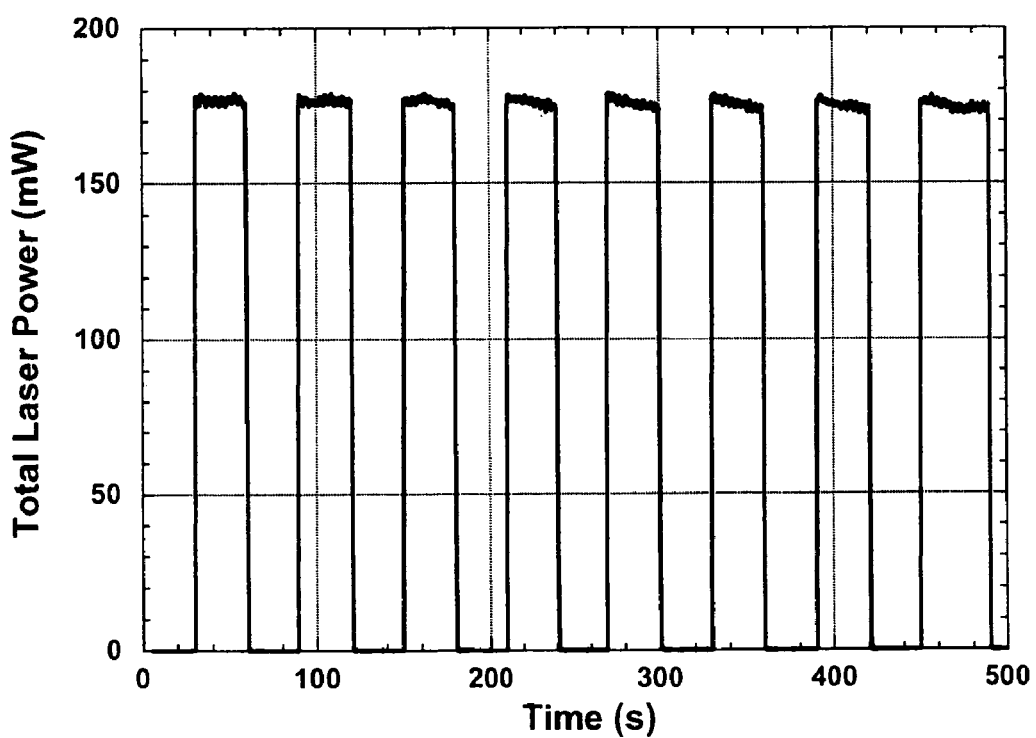

The threshold for laser oscillation lasing occurs at 260 W of rf discharge power and an estimated $O_2(a)$ yield of 12% in the subsonic flow tube, as shown in FIG. 23. Note that there is a roll off in laser power beyond 450 W that is greater than the drop in $O_2(a)$ yield which is in part attributed to discharge instabilities. Even in the absence of discharge instabilities, laser oscillation would likely decrease at higher powers for these conditions as a consequence of two factors: (i) higher powers result in higher gas temperatures and consequently lower gain and (ii) progressively more O atoms are generated at higher powers while the NO flow rate was optimized for 450 W. (An excess of O atoms have been found to quench the excited I* atom). A long duration run time test was performed and the laser power was relatively stable at 220 mW±10 mW for more than 33 minutes, as shown in FIG. 24. The cause of the small oscillations in FIG. 24 with a period of approximately 33 s corresponds to small fluctuations in the iodine source temperature (kept at 83° C.±2° C.) and therefore is likely a consequence of small fluctuations in the iodine flow rate. A second long duration test was performed in which the rf power, and consequently the laser power, was cycled on and off, FIGS. 25a-25b; the power was found to be stable to within ±2% over the 32 minute test.

Figure 26:
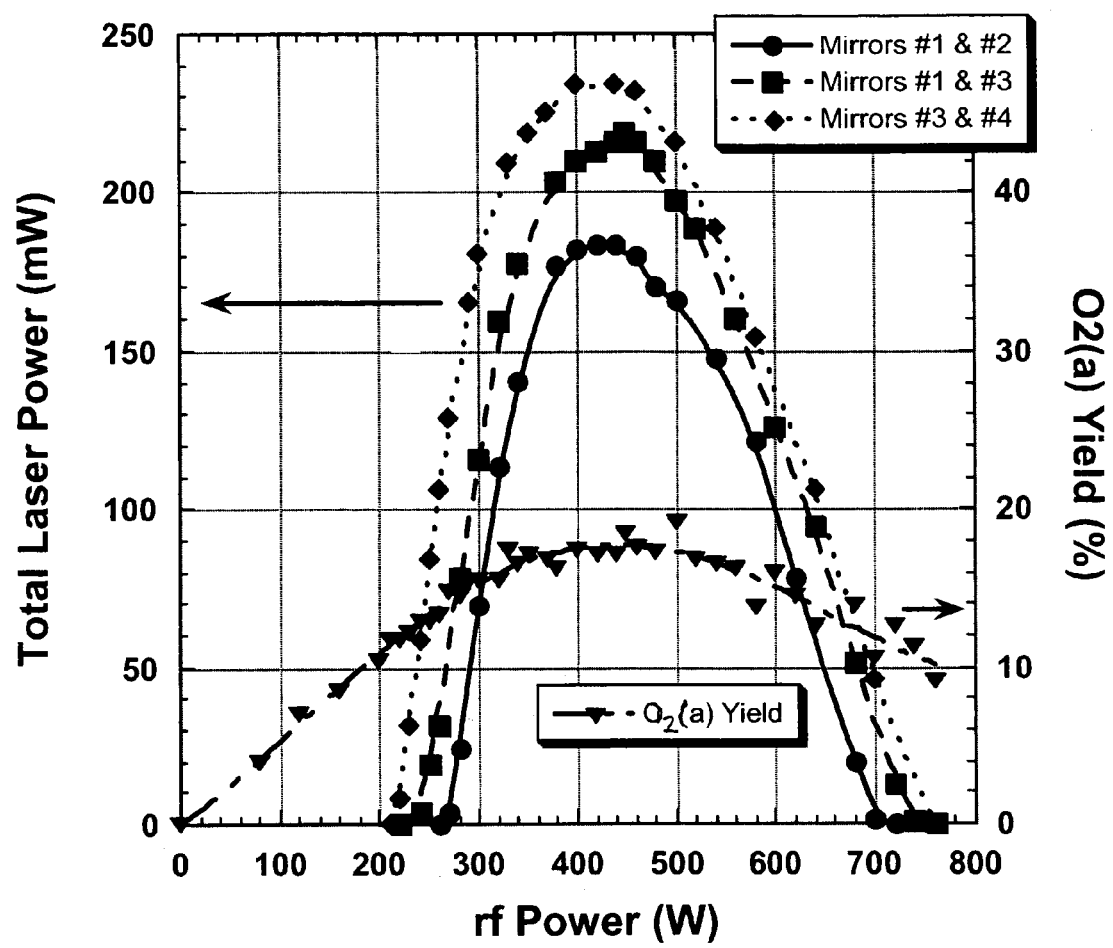
FIG. 26 shows $O_2(a)$ yield in the subsonic diagnostic section and total laser power in the supersonic cavity as a function of rf discharge power, for three different mirror sets. Subsonic flow tube pressure of 12.5 torr.
Figure 27:
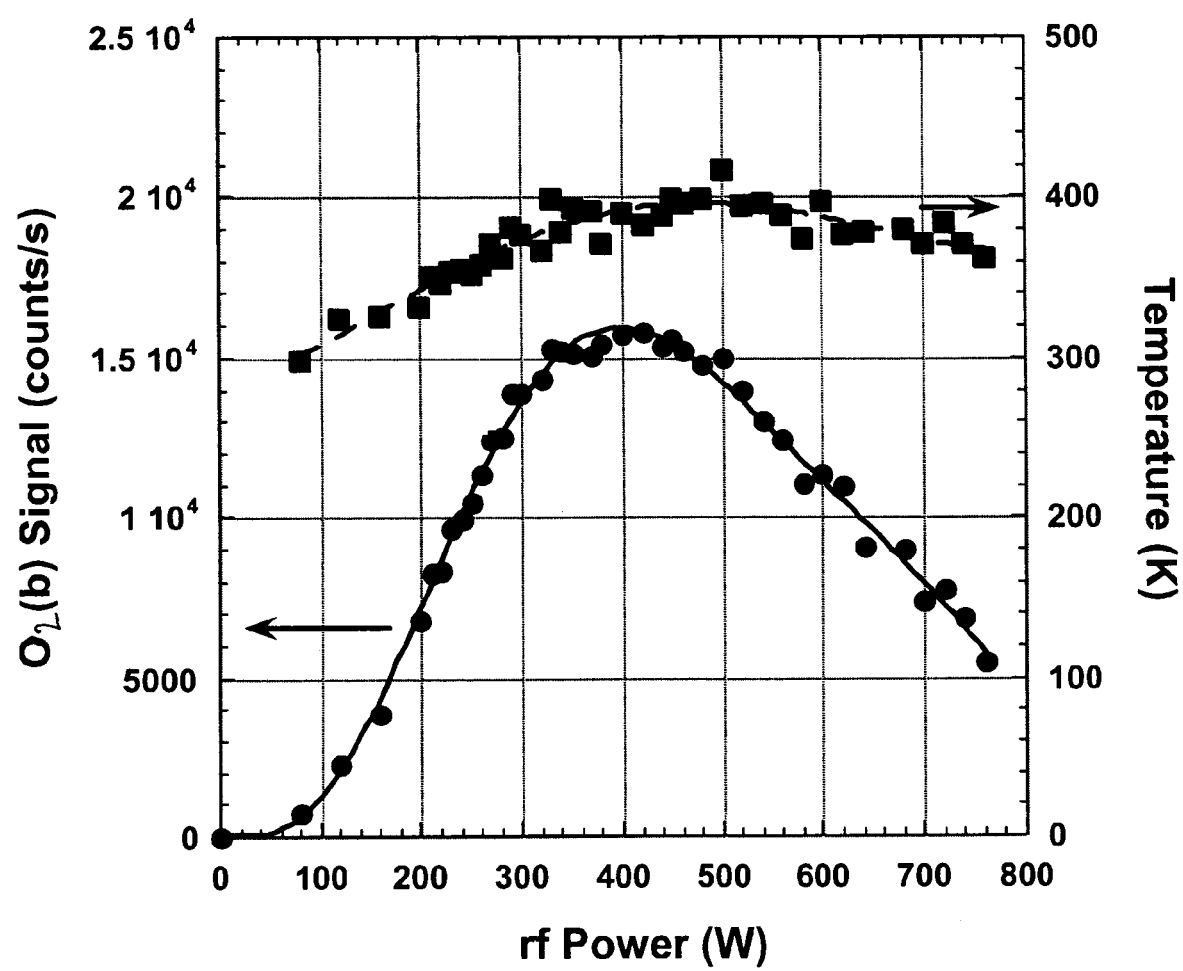
FIG. 27 illustrates $O_2(b)$ signal and flow temperature in the subsonic diagnostic section as a function of rf discharge power. Subsonic flow tube pressure of 12.5 torr.

A third set of experiments were run for three different mirror sets having different reflectivities. The same flow conditions discussed above in the second set of experiments were used for the third set experiments. Simultaneous measurements of laser power, $O_2(a)$ yield, $O_2(b)$ signal, and subsonic temperature were made as a function of rf discharge power as shown in FIGS. 26 and 27. For the above flow conditions a peak laser output power of 184 mW was obtained with the Mirror #1/#2 combination, 219 mW with the Mirror #1/#3 combination, and 234 mW with the Mirror #3/#4 combination. The yield of $O_2(a)$ was ≈17% with a temperature of ≈410 K in the subsonic diagnostic duct for the peak power points. For all but the low laser output power points, the beam shape was circular with a diameter of ≈1.9 cm, the same as the clear aperture of the mirror mounts. For the low laser output power data the beam size was circular, but only a few mm in diameter, which is probably a result of the highest gain region being in the core of the flow in the supersonic nozzle. The reasons for the drop in laser output power above 450 W of rf power are the same as discussed above for FIG. 23, i.e., discharge instabilities, higher temperature, and higher O atom production.

There are several interesting points to make from FIG. 26. First, the laser output power was always higher with the progressively higher reflectivity mirrors. Along similar lines, the laser threshold shifted to lower rf power as the reflectivity of the mirrors increased; this is consistent with the required threshold gain $\gamma_{th}$ being smaller for higher reflectance mirrors [from Table 1 and Eq. (1), $\gamma_{th}=2.8\times10^{-5}$ $cm^{-1}$ for the #1/2 mirror set, $\gamma_{th}=2.1\times10^{-5}$ $cm^{-1}$ for the #1/3 mirror set, and $\gamma_{th}=1.4\times10^{-5}$ $cm^{-1}$ for the #3/4 mirror set]

and that the $O_2(a)$ yield and gain decrease with lower rf power. In other words, the data support the expectation that higher reflective mirrors will lase at a lower value of gain. Note also that there is a variation in peak output power for the data presented in FIGS. 23-26 all having approximately the same flow conditions and the same #1/#2 mirror set; we believe that the differences are primarily due to variations of a few degrees K in the day-to-day room temperature of the laboratory that consequently affected the vapor pressure of $I_2$ in the unheated $I_2$ sublimation cell.

FIG. 27 shows a drop in temperature above 500 W of rf power as measured by the $O_2(b)$ spectra; this was unexpected. It is believed that this may be a consequence of the flow volume viewed and the discharge instabilities.

Post-discharge modeling, such as kinetic/laser modeling, of the experimental conditions discussed the experiments without $NO_2$ indicated that increasing the $I_2$ flow rate should improve gain and laser power. As such, experiments that varied the $I_2$ flow rate were performed. Other than the $I_2$ and the $I_2$ carrier gas (helium) flow rates, all of the other flow conditions were the same as discussed above (without the $NO_2$ downstream). First, the secondary flow rate of helium was increased and was found to optimize laser power with a flow rate of 3.0 mmol/s of He rather than the 2.0 mmol/s used in previous sections. The $I_2$ flow rate with a room temperature (25° C.) $I_2$ sublimation cell temperature and 3.0 mmol/s of secondary He was 0.014 mmol/s of $I_2$. The laser power with the #3 and #4 mirror set (relatively high reflectivity) increased to 260 mW.

To obtain further increases in the iodine flow rate the iodine sublimation cell was heated. With a 3.0 mmol/s secondary flow rate of helium, the $I_2$ flow rate at ≈30° C. was approximately 0.022 mmol/s, at ≈40° C. the $I_2$ flow rate was approximately 0.036 mmol/s, and at ≈50° C. the $I_2$ flow rate was approximately 0.052 mmol/s. The power optimized around an $I_2$ flow rate of 0.040 mmol/s. Small signal gain and laser power measurements were made for the $I_2$ flow rates of 0.022 and 0.036 mmol/s cases as a function of rf power, FIGS. 28 and 29. The laser measurements were made using the #3/#4 mirror set.

Figure 28:
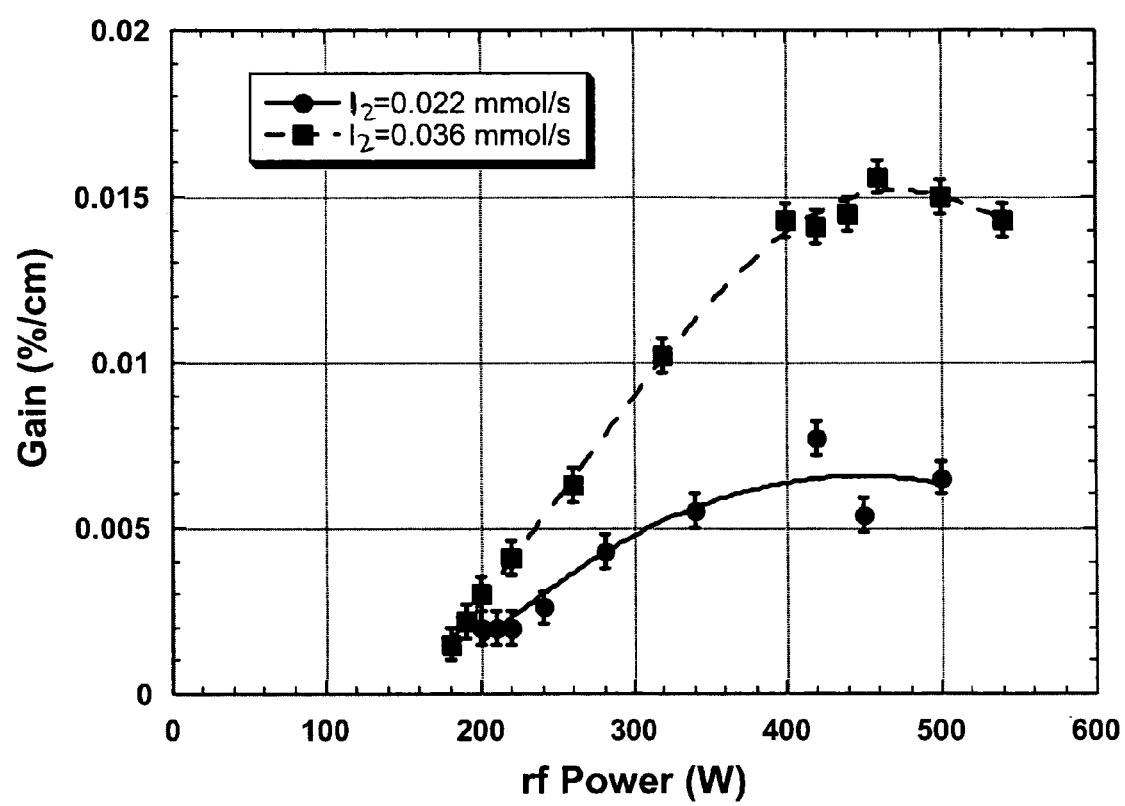
FIG. 28 illustrates gain in the supersonic cavity as a function of rf discharge power, for two different iodine flow rates. Subsonic flow tube pressure of 12.5 torr.
Figure 29:
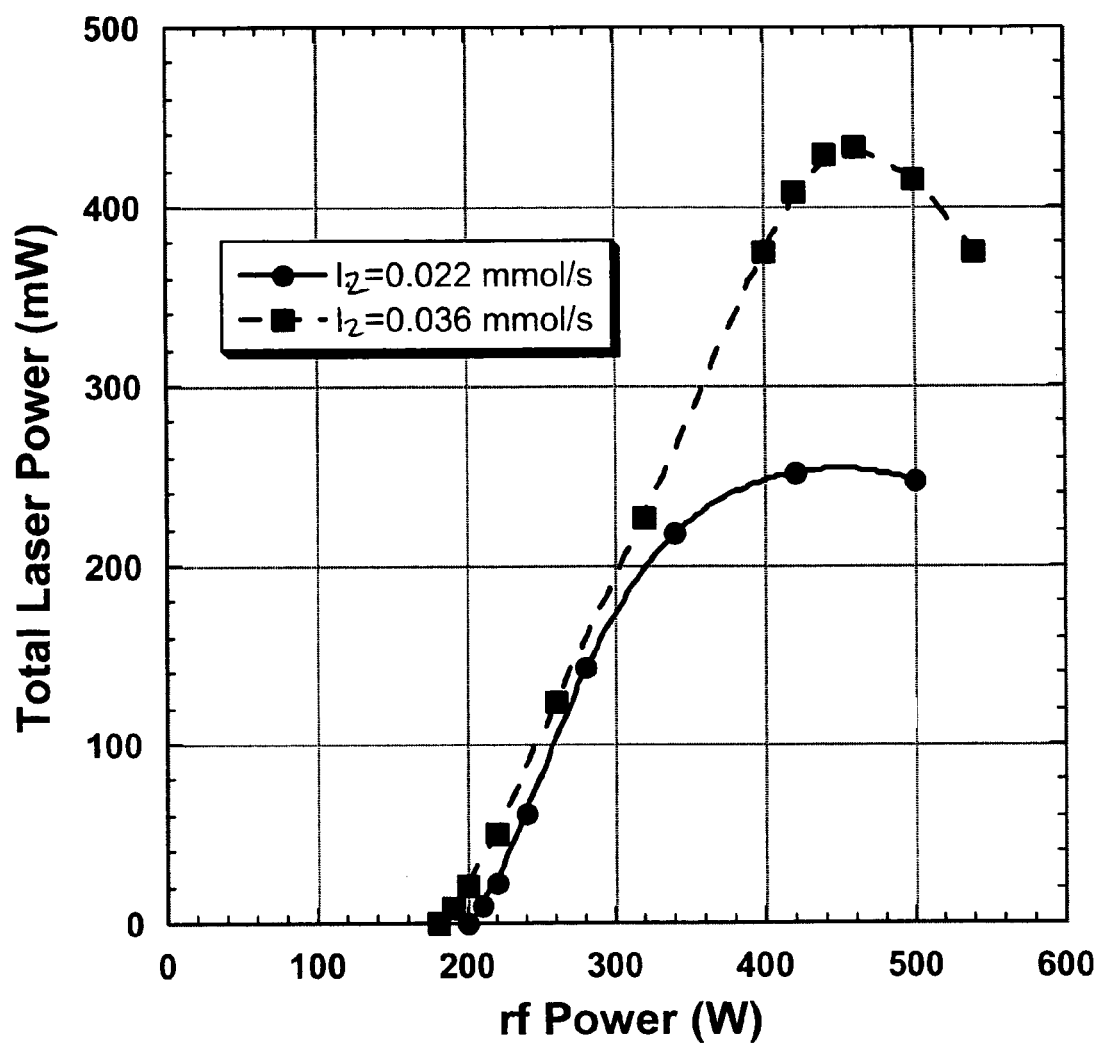
FIG. 29 illustrates total outcoupled laser power in the supersonic cavity as a function of rf discharge power, for two different iodine flow rates. Subsonic flow tube pressure of 12.5 torr.

FIG. 28 shows that the gain increased substantially with the higher iodine flow rate, going from a peak of approximately 0.0077% cm$^{-1}$ to 0.0156% cm$^{-1}$, roughly a factor of two increase in gain. This result is consistent with the significantly higher laser power that was measured for the 0.036 mmol/s of $I_2$ case, FIG. 29. The total laser power that was measured for the 0.036 mmol/s of $I_2$ case was 440 mW. A few additional measurements produced as high a power as 510 mW for a slightly higher $I_2$ flow rate of 0.040 mmol/s. The lineshapes from the gain profiles (not illustrated for brevity) indicated laser cavity temperatures of ≈160 K for the 0.022 mmol/s $I_2$ case and ≈190 K for the 0.036 mmol/s $I_2$ case. Note that a higher $I_2$ flow rate should result in more heat release from chemical reactions, consistent with the lineshapes that indicated a higher temperature with more $I_2$ flow.

If we extrapolate the gain vs. rf power curves back to optical transparency (zero gain) on FIG. 28, we find that both curves intersect zero gain at approximately 160 W of rf power. Knowing the temperature, we can make an estimate of the $O_2(a)$ yield in the supersonic cavity at this position using $Y_{OT}=1/[1+1.5 \exp(403/T)]$. For temperatures of 160 K and 190 K, the yields for optical transparency are 5.1% and 7.4% in the supersonic cavity, respectively. From FIG. 26, the yield in the subsonic region at 160 W is approximately 8.5%, so there is a drop in yield as the flow goes downstream from the subsonic diagnostic duct. Observe that the yield in the supersonic cavity at 160 W of rf power is approximately 5.1% with 0.022 mmol/s of $I_2$ and 7.4% with 0.036 mmol/s of $I_2$, i.e., a lower yield with lower $I_2$ flow. This observation seems counter-intuitive because one would a priori expect a lower yield with higher $I_2$ flow rate in a classic COIL device. A possible explanation for this phenomenon is that there may still be a significant excess of O atoms in the lower $I_2$ flow rate case, while the higher $I_2$ flow rate case more efficiently removes O atoms during the $I_2$ dissociation process,

$$I_2+O \rightarrow IO+I \quad (2.3)$$

$$IO+O \rightarrow O_2+I \quad (2.4)$$

thereby leaving significantly fewer O atoms to quench the I* state via

$$I^*+O \rightarrow I+O. \quad (2.5)$$

Note that every $I_2$ molecule removes two O atoms through reactions (2.3) and (2.4). These reactions were found to play critical roles in the earlier gain demonstrations.

Further tests were done without NO and with $NO_2$ injected downstream. Because NO was found to enhance the production of $O_2(a)$ by approximately 30-50% when run through the discharge, a very limited number of experiments were performed without NO in the discharge. Using the #3 and #4 mirror combination, a total of 132 mW of outcoupled laser power was measured with zero NO flow and an $NO_2$ flow rate of 0.35 mmol/s. The $I_2$ flow rate was approximately 0.027 mmol/s. Other than the NO, $NO_2$, and $I_2$ flow rates, all of the other flow conditions were the same as discussed in the experiments without $NO_2$ downstream. While lasing was demonstrated without NO in the discharge and with $NO_2$ added downstream to remove excess atomic oxygen, the performance was worse without NO in the discharge in all cases.

Further tests were conducted with an initial flow of $O_2/He/NO_2$ discharge without $NO_2$ injected downstream. Because NO was found to enhance the production of $O_2(a)$ when run through the discharge, we decided to examine the substitution of $NO_2$ for NO in the discharge. The performance optimized with an $NO_2$ flow rate of 0.35 mmol/s, but the peak $O_2(a)$ yield in the subsonic region was only approximately 11%, and the total outcoupled power was 132 mW using the #3 and #4 mirror combination. The $I_2$ flow rate was approximately 0.034 mmol/s. Other than the NO, $NO_2$, and $I_2$ flow rates, all of the other flow conditions were the same as discussed in the experiments conducted with $O_2/He/NO$ discharge without $NO_2$ downstream. While moderate performance was demonstrated with $NO_2$ in the discharge, the performance was significantly worse than the results with NO in the discharge.

The second type of discharge tested was an inductively coupled rf discharge at 13.56 MHz in which the power was delivered to the discharge gas mixture through an inductive coil that surrounded the 4.9 cm inside diameter tube. This coil had five turns, was approximately 6.4 cm long in the flow direction, and had a resistive component of ≈0.46Ω. The inductive discharge had a plasma zone that was approximately 4.9 cm in diameter and 15-25 cm long (depending upon the amount of electric power deposited into the plasma, but always following the trend of a longer plasma zone with higher power).

Figure 30:
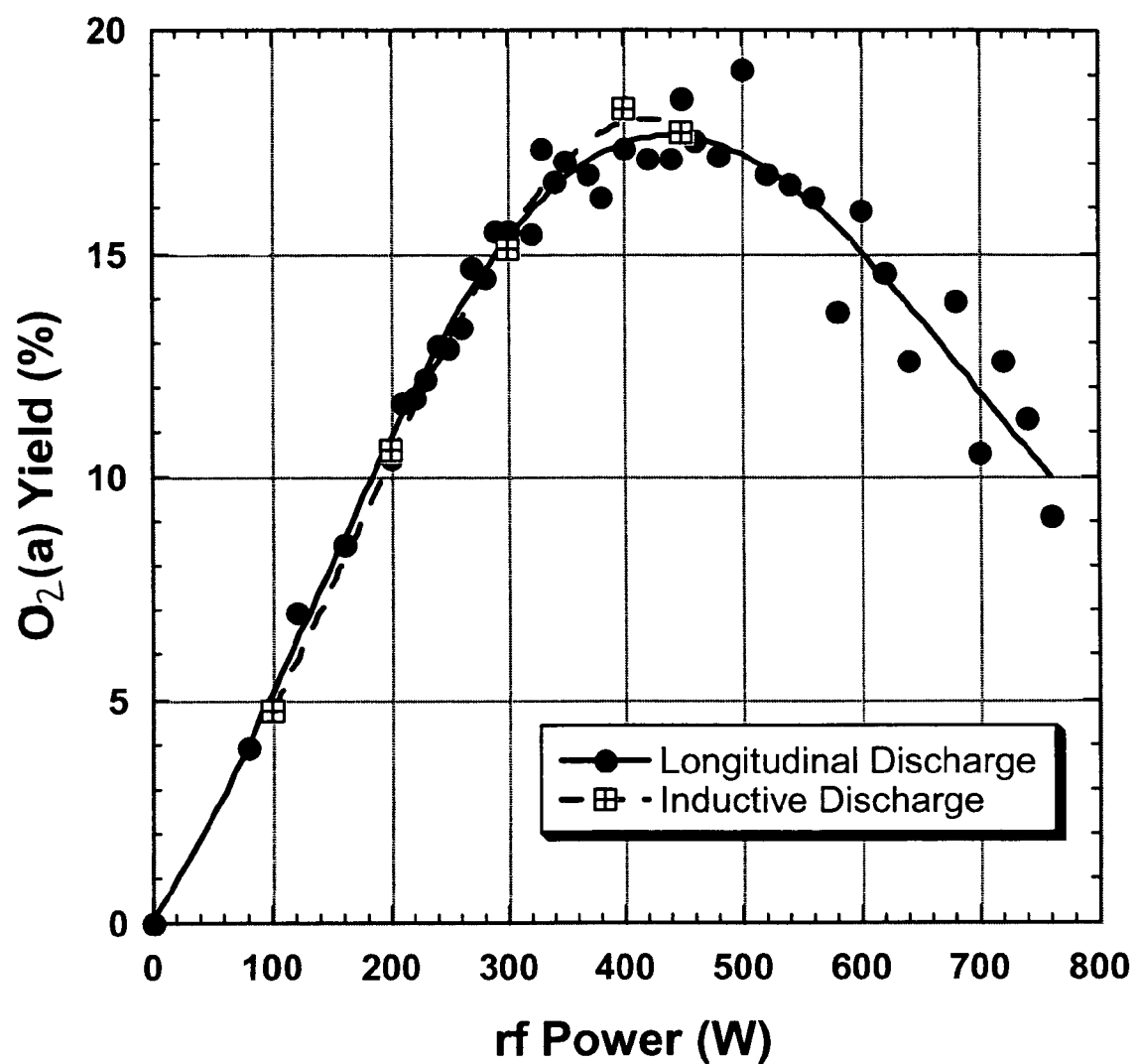
FIG. 30 shows $O_2(a)$ yield in the subsonic diagnostic section as a function of rf discharge power, for the longitudinal and the inductive discharges. Subsonic flow tube pressure of 12.5 torr.

Measurements of $O_2(a)$, $O_2(b)$, and laser power were made with the inductive discharge. The flow conditions were the same as those discussed in experiments with $O_2/He/NO$ discharge without NO$_2$ injected downstream and varied I$_2$ flow, with an I$_2$ flow rate of ≈0.035 mmol/s. It was found that the inductive discharge gave approximately the same O$_2$(a) yield, FIG. 30, and O$_2$(b) signal strengths as the longitudinal discharge [note that for brevity the O$_2$(b) data is not illustrated]. At 400 W of rf power, the total laser power was approximately 524 mW using the #7/#8 mirrors. (Note that the #7/#8 mirror combination was the highest reflectivity pair of mirrors, Table 1.)

In previous experiments with argon diluent we have seen significantly worse O$_2$(a) signals and yields with these types of discharges in the flow tube arrangement. However, argon is still an attractive diluent because it is less expensive than helium and it is easier to pump than helium because of its higher molecular weight. Therefore, experiments were performed with O$_2$/Ar/NO discharge without NO$_2$ downstream to establish the laser performance with argon.

Figure 31:
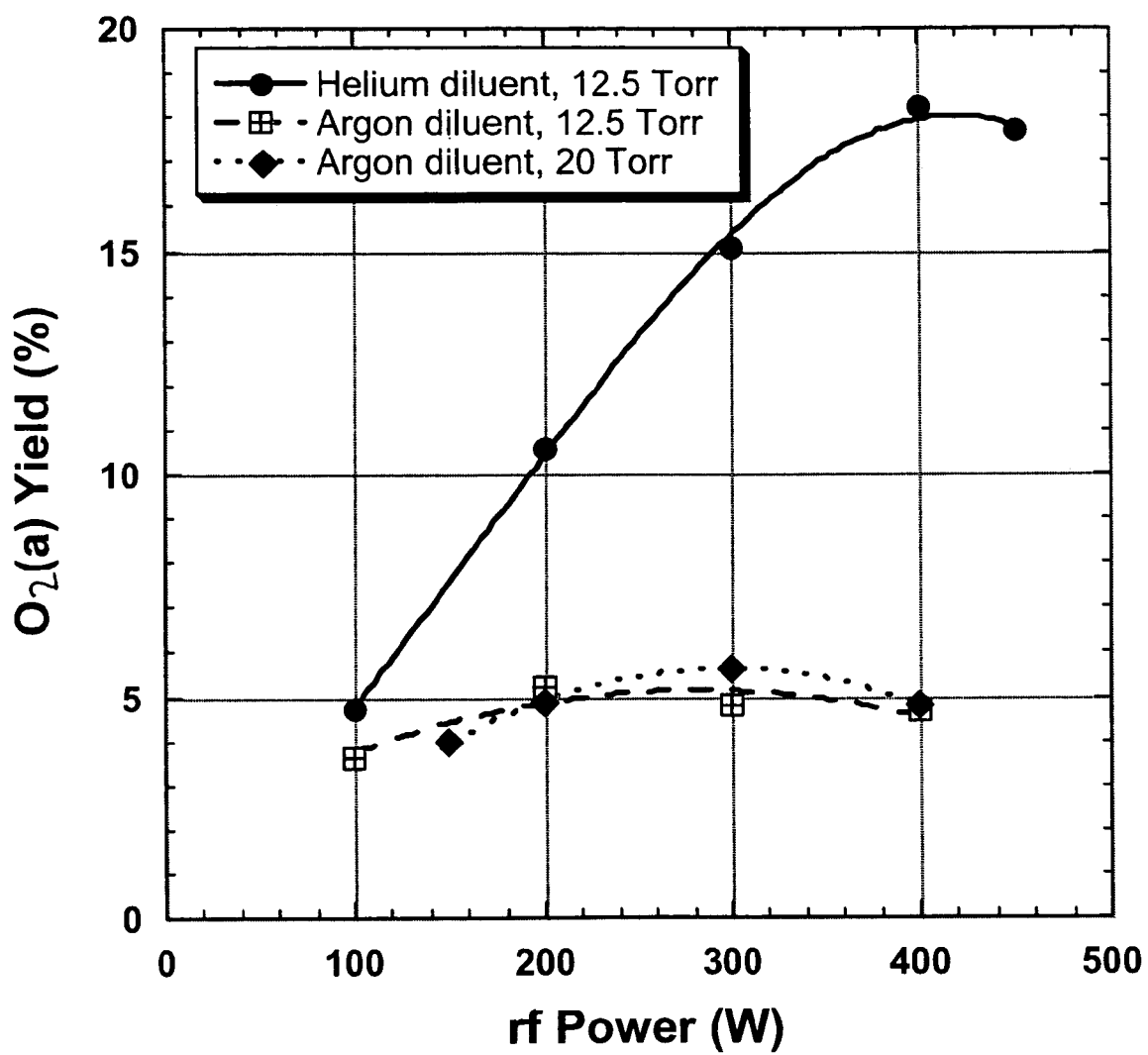
FIG. 31 illustrates $O_2(a)$ yield in the subsonic diagnostic section as a function of rf power with the inductive discharge, for different discharge diluents and pressures. In all cases there was a flow of 3 mmol/s of $O_2$, 16 mmol/s of diluent (either helium or argon), and 0.15 mmol/s of NO through the discharge section.

FIG. 31 shows the O$_2$(a) yield in the subsonic diagnostic section as a function of rf power with the inductive discharge, for different discharge diluents and pressures. In all cases there was a flow of 3 mmol/s of O$_2$, 16 mmol/s of diluent (either helium or argon), and 0.15 mmol/s of NO through the discharge section. Two pressures were investigated, 12.5 Torr and 20 Torr. As in previous studies it was determined that the helium performance was significantly higher than that with argon. But, interestingly, the yield for the two argon pressure cases was approximately the same as the pressure increased, which is contrary to microwave excitation data reported by the prior art, which showed a decrease in yield as the partial pressure of O$_2$ increased (though it should be noted that prior art experiments worked in a pressure regime approximately an order of magnitude lower than our regime).

The total outcoupled laser power for the helium diluted case peaked at 524 mW with the #7/#8 mirror combination and 400 W of rf power. With the same mirrors, zero laser power was observed with argon diluent at 12.5 Torr, however 29 mW of laser power was observed with argon diluent at 20 Torr and 400 W of rf power. It is interesting that lasing was observed at 20 Torr, but not 12.5 Torr for the argon diluted case when both have approximately the same yield of O$_2$(a), FIG. 31. It is believed that the explanation for this is simply that the higher pressure case has a significantly higher flow rate of cold tertiary N$_2$ (≈35 mmol/s for the 12.5 Torr case, and was ≈93 mmol/s for the 20 Torr case), thereby lowering the stagnation temperature of the flow and consequently the temperature in the supersonic cavity. With a lower temperature, the yield for optical transparency is lower, and hence positive gain and lasing occurred for the higher pressure case, but not the lower pressure case.

Various mixes of 3 mmol/s of O$_2$ with a total of 16 mmol/s of helium and argon were also tested through the discharge. The results all at a pressure of 12.5 Torr indicated a monotonic trend towards better O$_2$(a) yield production with more helium and less argon in the discharge section.

In further experiments a combination of a pulsed discharge to initiate high concentrations of electrons with a sustained electric field to maintain the electron density between pulses was used to attempt to control the critical E/N parameter, and thus enabling more of the electrical energy into the desired O$_2$(a) state. As such, a combination of a high frequency, bi-polar, high-voltage (HV) pulser combined with the rf inductive coil discharge as a "sustainer", was used to create a "pulser-sustainer" discharge. The pulse repetition rate of the bipolar pulser was 100 kHz, with a pulse length of 0.5 μs, and a variable peak power as discussed below. The pulsed discharge was conducted through the same longitudinal hollow cathodes discussed previously via a 5:1 transmission line transformer, and thus the plasma zone of this third type of discharge between the hollow cathodes was approximately 4.9 cm in diameter and 25 cm long.

Figure 32:
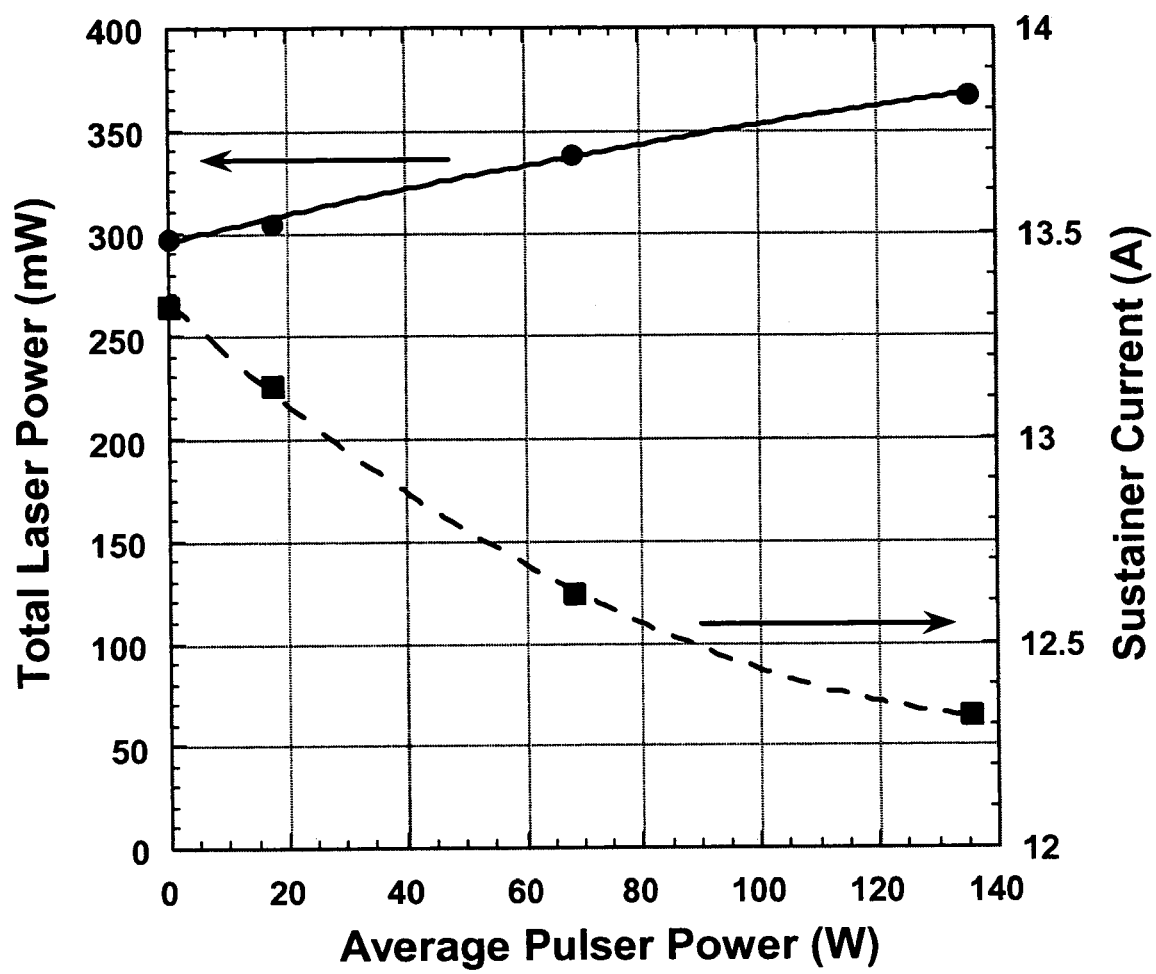
FIG. 32 shows Total laser power and current through the coil of the inductive sustainer as a function of the average pulser power.

FIG. 32 shows the total laser power and the current through the inductive coil sustainer as a function of the DC power supplied to drive the pulse. The flow conditions were similar to those discussed in O$_2$/He/NO discharge without NO$_2$ downstream, with an I$_2$ flow of approximately 0.025 mmol/s. As power is added to the pulser the laser power increases. Significantly, as power is added to the pulser the current through the sustainer coil decreases. Since the electric field E$_\phi$ from the inductive coil is proportional to the current I, as I decreases, then so must E$_\phi$ and consequently E$_\phi$/N. This is encouraging as it shows the desired trend, i.e., that of lowering E$_\phi$/N with the addition of the pulser.

In summary of the second embodiment, cw laser action was measured on the I*→I electronic transition of the iodine atom at 1315 μm pumped by a near resonant energy transfer from O$_2$(a) produced in an electric discharge. A tertiary cold gas injection followed by expansion in a supersonic cavity was employed to lower the temperature of the flow and shift the equilibrium of atomic iodine in favor of the I* state. This produced sufficient population inversion to observe gains of as high as ≈0.015% cm$^{-1}$. Laser oscillations were obtained for differing flow conditions and discharge arrangements when two high reflectivity mirrors were used to form an optical resonator surrounding the gain medium. Lasing was achieved under a variety of flow conditions, which included: an O$_2$/He/NO mixture running through the discharge and with NO$_2$ added downstream to remove excess atomic oxygen; an O$_2$/He mixture running through the discharge with NO$_2$ added downstream to remove excess atomic oxygen; an O$_2$/He/NO mixture running through the discharge in the absence of NO$_2$ added downstream; an O$_2$/He/NO$_2$ mixture running through the discharge in the absence of NO$_2$ added downstream; and an O$_2$/Ar/NO mixture running through the discharge in the absence of NO$_2$ added downstream.

Laser oscillation was also achieved with three different discharge configurations: (i) a longitudinal rf discharge, (ii) an inductive rf discharge, and (iii) a pulser-sustainer configuration in which a bi-polar HV pulser was combined with an inductive rf sustainer discharge. The highest laser output power obtained in these experiments was approximately 520 mW in a stable cavity composed of two ≈99.995% reflective mirrors. One set of experiments demonstrated a laser output power of 220 mW that was stable for more than 30 minutes, and another set of experiments demonstrated the ability to cycle the electrical power on and off to produce repeatable laser power over a 30 minute period.

It is further noted that the present embodiments include an electrical generator that may be a continuous discharge (either continuous longitudinal discharge or a continuous inductive discharge). The electrical generator may also include a pulse generator, but such is not necessary for lasing. The electrical discharge may further be an rf, Microwave, or an AC or DC generator.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. An oxygen-iodine laser system having a laser resonator with a laser active gas mixture of at least excited oxygen and dissociated iodine, comprising:
   a first gas mixing section;
   a first means to introduce ground state oxygen into the first gas mixing section to create an initial flow, said initial flow further contains a carrier gas;
   an electrical generator downstream of the first gas mixing section in which a primary flow comprising of at least said excited oxygen is electrically generated from the initial flow;
   a second means to introduce a sensitizer gas into the first gas mixing section, said sensitizer gas having a lower ionization threshold than ground state oxygen such that electrons are more easily produced in said electrical generator; and
   a third means to introduce a source of iodine into the primary flow to generate a mixture of laser-active gas.

2. The system of claim 1 wherein the sensitizer gas is selected from the group consisting of NO, $NO_2$, $H_4N_2$, Hg, or $C_4H_4O$ and consists of about 0.1 to 10% of a ground state oxygen flow rate.

3. The system of claim 1 further comprising a fourth means to introduce a heavier molecular weight diluent gas into the primary flow downstream of the electrical generator.

4. The system of claim 3 wherein the heavier molecular weight diluent gas may include one of the following Ar, or $N_2$.

5. The system of claim 4 wherein the heavier molecular weight diluent gas is cooled to a temperature of around 150 to 200K.

6. The system of claim 3 wherein the fourth means to introduce said gas is positioned downstream of said third means to introduce a source of iodine.

7. The system of claim 3 further comprising a fifth means to introduce $NO_2$ into the primary flow.

8. The system of claim 7 wherein the fifth means is positioned upstream of said third means to introduce a source of iodine.

9. The system of claim 1 further comprising a means to condition the initial flow.

10. The system of claim 9 wherein the conditioning means is positioned between said first means to introduce ground state oxygen and said second means to introduce said sensitizer gas.

11. The system of claim 9 wherein the conditioning means is defined as having:
    a first face positioned towards the initial flow and a second face positioned towards the electrical generator; and
    a channel defined as having an inlet on the first face connected to an outlet on the second face to permit the initial flow to move through the conditioning means, said channel being disposed at an angle offset from a longitudinal axis defined in the first gas mixing section.

12. The system of claim 11, wherein the conditioning means includes a plurality of channels disposed at a corresponding angle.

13. The system of claim 12, wherein each corresponding angle is disposed to create swirling of the initial flow.

14. The system of claim 9, wherein the conditioning means is defined as having:
    a body having a first face positioned towards the initial flow and a second face positioned towards the electrical generator;
    a bore through the body to permit the initial flow to move therethrough, the bore having an interior sidewall;
    at least one outlet positioned along the interior sidewall of said bore; and
    an inlet defined through the body in communication with said outlet to introduce one of the following gases into the initial flow, including but not limited to said ground state oxygen, said sensitizer gas, or said carrier gas.

15. The system of claim 14 further comprising a plurality of outlets disposed tangentially along said sidewall.

16. The system of claim 15, wherein the bore is cylindrical.

17. An oxygen-iodine laser comprising:
    a mixing section having an initial flow of at least ground state oxygen;
    first means for introducing a carrier gas into the initial flow;
    means for conditioning the carrier gas and ground state oxygen creating a conditioned flow;
    means for generating a flow of singlet delta oxygen from said conditioned flow;
    second means for introducing a source of iodine into the flow of singlet delta oxygen for generating a mixture of laser-active gas;
    means for extracting energy from the laser-active gas to produce a laser beam and;
    a third means to introduce a sensitizer gas into carrier gas and the ground state oxygen, said sensitizer gas having a lower ionization threshold than ground state oxygen such that electrons more easily discharge in said generating means.

18. The laser of claim 17 wherein the conditioning means is defined as having:
    a first face positioned towards the initial flow and a second face positioned towards the generating means; and
    a channel defined as having an inlet on the first face connected to an outlet on the second face to permit the initial flow to move through the conditioning means, said channel being disposed at an angle offset from a longitudinal axis defined in the first gas mixing section, whereby said initial flow becomes said conditioned flow upon exiting said outlet.

19. The laser of claim 18, wherein the conditioning means includes a plurality of channels disposed at a corresponding angle.

20. The laser of claim 19, wherein each corresponding angle is disposed to create a swirl of the initial flow.

21. The laser of claim 17, wherein the conditioning means is defined as having:
    a body having a first face positioned towards the initial flow and a second face positioned towards the electrical generator;
    a bore through the body to permit the initial flow to move therethrough, the bore having an interior sidewall;
    at least one outlet positioned along the interior sidewall of said bore; and
    an inlet defined through the body in communication with said outlet to introduce either said ground state oxygen, said carrier gas and/or said sensitizer gas into the initial flow.

22. The laser of claim 21 further comprising a plurality of outlets disposed tangentially along said sidewall.

23. The laser of claim 22, wherein the bore is cylindrical.

24. The laser of claim 17, wherein the sensitizer is selected from the group consisting of NO, $NO_2$, $H_4N_2$, Hg, or $C_4H_4O$.

25. The laser of claim 17, wherein the sensitizer gas consists of about 0.01 to 10% of a ground state oxygen flow rate.

26. The laser of claim 17 further comprising a fourth means to introduce a heavier molecular weight diluent gas into the flow of singlet delta oxygen downstream of the generating means and upstream of the means for extracting energy.

27. The laser of claim 26 wherein the heavier molecular weight diluent gas is Ar or $N_2$ and is cooled to a temperature of around 180K.

28. The system of claim 17 further comprising a fifth means to introduce $NO_2$ into the flow of singlet delta oxygen, said fifth means is positioned upstream of said second means to introduce a source of iodine.

29. In an oxygen iodine laser having a gas mixing section for mixing gases and an electrical generator downstream of the gas mixing section for generating at least excited oxygen, the improvement comprising:
   a conditioner having a first side faced downstream of the gas mixing section and a second side faced upstream of the gas mixing section and positioned upstream of the electrical generator; and
   at least one channel defined as having an inlet on the first face connected to an outlet on the second face to permit a flow of gases to move through the conditioner, said channel being disposed at an angle offset from a longitudinal axis defined in the gas mixing section, whereby said flow of gases becomes a conditioned flow upon exiting said outlet.

30. The laser of claim 29, wherein the conditioner includes a plurality of channels, each channel being disposed at a corresponding angle.

31. The laser of claim 30, wherein each corresponding angle is disposed to create a swirling flow of gases.

32. In an oxygen iodine laser having a gas mixing section for mixing gases, the improvement comprising:
   a conditioner having a body with a first side faced downstream of the gas mixing section and a second side faced upstream of the gas mixing section;
   a bore through the body to permit a flow of gas to move therethrough, the bore having an interior sidewall;
   at least one outlet positioned along the interior sidewall of said bore; and
   an inlet defined through the body in communication with said outlet to introduce a gas into the gas mixing section.

33. The laser of claim 32 further comprising a plurality of outlets disposed tangentially along said sidewall.

34. The laser of claim 33, wherein the bore is cylindrical.

35. In an oxygen iodine laser having a gas mixing section for mixing a flow and an electrical generator downstream of the gas mixing section for generating at least excited oxygen, the improvement comprising:
   a conditioner having a first side faced downstream of the gas mixing section and a second side faced upstream of the gas mixing section and positioned upstream of the electrical generator and at least one opened region defined by said conditioner to permit the flow to move from a downstream position to an upstream position, said opened region having a means to change a direction of the flow.

36. The laser of claim 35, wherein the means to change the direction of the flow includes the opened region being interspaced among a closed region and disposing the opened region at an angle offset from a longitudinal axis defined in the gas mixing section.

37. The laser of claim 35, wherein the conditioner includes a plurality of opened regions spaced about a closed region.

38. The laser of claim 37, wherein each opened region, of said plurality of opened regions, is disposed at a corresponding angle that is offset from a longitudinal axis defined in the gas mixing section to create a swirling flow of gases.

39. The laser of claim 35, wherein the means to change the direction of the flow includes:
   an outlet positioned along an interior sidewall of said opened region; and
   an inlet defined through the conditioner and in communication with said outlet to introduce a gas into the flow.

40. The laser of claim 39 wherein the conditioner includes a plurality of outlets disposed along said interior sidewall.

41. The laser of claim 40, wherein the opened region has an annular shape.

42. The laser of claim 41, wherein the plurality of outlets are disposed tangentially along said interior sidewall.

* * * * *